(12) United States Patent
Yang et al.

(10) Patent No.: US 12,277,390 B2
(45) Date of Patent: Apr. 15, 2025

(54) ELECTRONIC DEVICE FOR PROCESSING USER'S INQUIRY, AND OPERATION METHOD OF THE ELECTRONIC DEVICE

(71) Applicant: Samsung Electronics Co., Ltd., Suwon-si (KR)

(72) Inventors: Dongil Yang, Suwon-si (KR); Hoyoung Kim, Suwon-si (KR); Jaehyung An, Suwon-si (KR); Jiyeon Lee, Suwon-si (KR); Cheolseung Jung, Suwon-si (KR); Wonjong Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 526 days.

(21) Appl. No.: 17/677,396

(22) Filed: Feb. 22, 2022

(65) Prior Publication Data

US 2022/0245340 A1 Aug. 4, 2022

Related U.S. Application Data

(63) Continuation of application No. PCT/KR2022/001281, filed on Jan. 25, 2022.

(30) Foreign Application Priority Data

Feb. 2, 2021 (KR) .................. 10-2021-0014979

(51) Int. Cl.
*G06F 40/279* (2020.01)
*G06V 30/18* (2022.01)
*G06V 30/19* (2022.01)

(52) U.S. Cl.
CPC ...... *G06F 40/279* (2020.01); *G06V 30/18143* (2022.01); *G06V 30/19013* (2022.01); *G06V 30/19093* (2022.01)

(58) Field of Classification Search
CPC ......... G10L 15/22; G06F 40/30; G06F 16/30; G06F 16/33; G06F 16/332;
(Continued)

(56) References Cited

U.S. PATENT DOCUMENTS 10,867,132 B2 12/2020 Yan et al.
11,055,355 B1 * 7/2021 Monti ............... G06F 16/90332
(Continued)

FOREIGN PATENT DOCUMENTS

| JP | 6802364 B2 | 12/2020 |
|---|---|---|
| KR | 10-2020-0033009 A | 3/2020 |
| KR | 10-2155739 B1 | 9/2020 |

OTHER PUBLICATIONS

Choi et.al., "A study on deriving social issues centered on keywords by applying the word embedding technique: Focusing on news articles related to the disabled," Journal of Information Management, 2018, vol. 35, vol. 1, pp. 231-250 pp. 231-246.
(Continued)

*Primary Examiner* — Thierry L Pham
(74) *Attorney, Agent, or Firm* — Jefferson IP Law, LLP

(57) ABSTRACT

An electronic device for providing a corrected response message according to an utterance intention of a user by using a keyword included in an input inquiry input by the user, and an operation method of the electronic device are provided. The electronic device includes receiving the input inquiry input by the user, identifying a representative inquiry according to an utterance intention of the user by analyzing the input inquiry by using a natural language understanding (NLU) model, extracting a keyword from the input inquiry by comparing a vector value of a first embedding vector of the input inquiry changed through the NLU model with a vector value of a second embedding vector of the representative inquiry, and correcting a response message mapped to
(Continued)

correspond to the representative inquiry, by using the extracted keyword.

15 Claims, 14 Drawing Sheets

(58) Field of Classification Search
CPC ............ G06F 16/3329; G06F 16/3344; G06F 16/3334; G06F 16/35; G06F 16/90; G06F 16/95; G06F 16/2452; G06F 16/24522; G06F 16/24578; G06F 40/35; G06F 40/02; G06V 30/18143; G06V 30/19093; G06V 30/19013
See application file for complete search history.

(56) References Cited

U.S. PATENT DOCUMENTS

| | | | |
|---|---|---|---|
| 2018/0052908 A1* | 2/2018 | Liu | G06F 16/316 |
| 2021/0264906 A1* | 8/2021 | Yuan | G10L 15/10 |
| 2021/0286949 A1 | 9/2021 | Hashimoto et al. | |
| 2021/0383798 A1* | 12/2021 | Zhang | G06F 16/3329 |

OTHER PUBLICATIONS

Hwang et al, "Word embedding using relative position information between words," Journal of Information Management, Sep. 2018, vol. 4 5, pp. 943-949, pp. 943-948.
International Search Report dated May 4, 2022, issued in International Patent Application No. PCT/KR2022/001281.

* cited by examiner

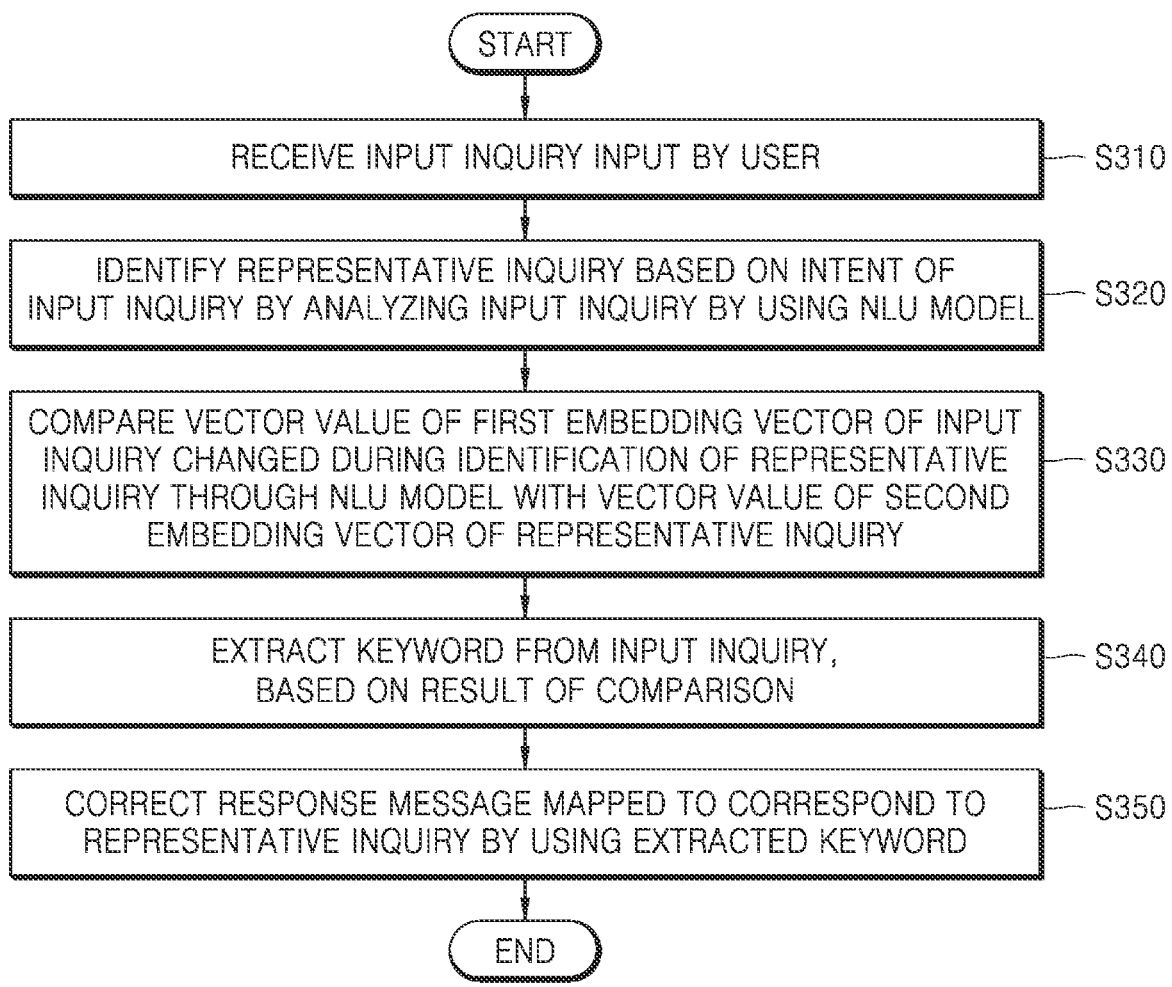

|  | Good Lock | MultiStar | is | What's | What |
|---|---|---|---|---|---|
| Good Lock | – | 0.9 | 0 | 0 | 0.02 |
| MultiStar | 0.9 | – | –0.5 | –1 | –0.8 |
| is | 0 | –0.5 | – | 0 | 0.05 |
| What's | 0 | –1 | 0 | – | 0.1 |
| What | 0.05 | 0.02 | 0.05 | 0.1 | – |

ELECTRONIC DEVICE FOR PROCESSING USER'S INQUIRY, AND OPERATION METHOD OF THE ELECTRONIC DEVICE

CROSS-REFERENCE TO RELATED APPLICATION(S)

This application is a continuation application, claiming priority under § 365(c), of an International application No. PCT/KR2022/001281, filed on Jan. 25, 2022, which is based on and claims the benefit of a Korean patent application number 10-2021-0014979, filed on Feb. 2, 2021, in the Korean Intellectual Property Office, the disclosure of which is incorporated by reference herein in its entirety.

TECHNICAL FIELD

The disclosure relates to an electronic device for processing an inquiry received from a user by using an artificial intelligence (AI) model and providing a response message to the user's inquiry, and an operation method of the electronic device.

BACKGROUND ART

When a user inputs an inquiry message to an electronic device or asks a question through a voice message, an inquiry responding system that provides an answer to a user's inquiry is used. In particular, an inquiry responding system for automatically outputting a response message to a user's inquiry by analyzing respective inquiry intents of a user for a plurality of inquiries by using an artificial intelligence (AI) model, classifying the plurality of inquiries according to the analyzed inquiry intents, and pairing and storing response messages for the classified inquiries has recently been used.

However, when a paired response message for an inquiry intent is fixed, a case where accurate answers to a user's various input queries cannot be provided may occur. Even when input inquiries are classified as having the same inquiry intent by the AI model, when a fixed response message is provided for an inquiry intent, a user may think that an electronic device does not properly recognize the inquiry, because various inquiry contents are provided. For example, when an input inquiry of "What's a MultiStar function?" is received from a user, an AI model may classify 'MultiStar function' as 'Good Lock function' and, when a response message "Are you saying that you are curious about a Good Lock function?" is output, the user may determine that an electronic device does not correctly recognize the input inquiry. In this case, the user may answer "no", and thus the electronic device may not provide accurate information about the input inquiry and may not provide satisfactory User eXperience.

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Technical Problem

Aspects of the disclosure are to address at least the above-mentioned problems and/or disadvantages and to provide at least the advantages described below. Accordingly, an aspect of the disclosure is to provide an electronic device for outputting a corrected response message according to an input inquiry by processing various input inquiries of a user, and an operation method of the electronic device.

Technical Solution to Problem

Additional aspects will be set forth in part in the description which follows and, in part, will be apparent from the description, or may be learned by practice of the presented embodiments.

In accordance with an aspect of the disclosure, a method, performed by an electronic device, of processing an inquiry of a user is provided. The method includes receiving an input inquiry input by the user, recognizing an intent of the input inquiry by analyzing the input inquiry by using a natural language understanding (NLU) model, and identifying a representative inquiry for the intent, comparing a vector value of a first embedding vector of the input inquiry changed during the identifying of the representative inquiry through the NLU model with a vector value of a second embedding vector of the representative inquiry, extracting a keyword from the input inquiry, based on a result of the comparing, and correcting a response message mapped to correspond to the representative inquiry, by using the extracted keyword.

The NLU model may be a deep neural network model trained through supervised learning that applies each of embedding vectors for a plurality of training inquiry messages previously obtained as an input and applies a label value for the intent as an output.

The identifying of the keyword from the input inquiry may include identifying the keyword from the input inquiry, based on a position relationship in a virtual vector space according to the vector value of the first embedding vector for one or more words included in the input inquiry changed by the NLU model and the vector value of the second embedding vector.

The identifying of the keyword from the input inquiry may include calculating a cosine similarity between the first and second embedding vectors, and identifying the keyword, based on a position proximity of the embedding vectors in the virtual vector space and the calculated cosine similarity.

The identifying of the keyword from the input inquiry may include identifying the keyword from the input inquiry, based on a distance change rate on the virtual vector space between the first embedding vector changed by the NLU model and the second embedding vector.

The correcting of the response message may include correcting the response message by replacing or changing a word included in the response message by using the extracted keyword or adding the extracted keyword to the response message.

The correcting of the response message may include generating an answer start message including at least one of additional information and an additional description related to the extracted keyword, and adding the answer start message to the response message.

The method may further include recognizing the intent for the input inquiry by analyzing the input inquiry by using the NLU model, and identifying the response message mapped to correspond to the recognized intent.

The method may further include determining whether to correct a confirm message included in the response message, based on a recognition rate of the intent.

In accordance with another aspect of the disclosure, an electronic device for processing an inquiry of a user is provided. The electronic device includes a communication interface configured to perform data transmission/reception with another device, a memory storing a program comprising one or more instructions of the program stored in the memory, and a processor configured to execute the one or more instructions. The processor is configured to receive an input inquiry input by the user through the communication interface, recognize an intent of the input inquiry by analyzing the input inquiry by using a natural language understanding (NLU) model, and identify a representative inquiry for the intent, compare a vector value of a first embedding vector of the input inquiry changed during the identifying of the representative inquiry through the NLU model with a vector value of a second embedding vector of the representative inquiry, extract a keyword from the input inquiry, based on a result of the comparing, and correct a response message mapped to correspond to the representative inquiry, by using the extracted keyword.

The NLU model may be a deep neural network model trained through supervised learning that applies each of embedding vectors for a plurality of training inquiry messages previously obtained as an input and applies a label value for the intent as an output.

The processor may be further configured to identify a keyword from the plurality of training inquiry messages, based on vector values of the embedding vectors changed through the training of the deep neural network model, generate a keyword list by using the identified keyword, and store the generated keyword list in the memory.

The processor may be further configured to identify the keyword from the input inquiry, based on a position relationship in a virtual vector space according to the vector value of the first embedding vector for one or more words included in the input inquiry changed by the NLU model and the vector value of the second embedding vector.

The processor may be further configured to calculate a cosine similarity between the first and second embedding vectors, and identify the keyword, based on a position proximity of the embedding vectors in the virtual vector space and the calculated cosine similarity.

The processor may be further configured to identify the keyword from the input inquiry, based on a distance change rate in the virtual vector space between the first embedding vector changed by the NLU model and the second embedding vector.

The processor may be further configured to correct the response message by replacing or changing a word included in the response message by using the extracted keyword or adding the extracted keyword to the response message.

The processor may be further configured to generate an answer start message including at least one of additional information and an additional description related to the extracted keyword, and add the answer start message to the response message.

The processor may be further configured to recognize the intent for the input inquiry by analyzing the input inquiry by using the NLU model, identify the response message mapped to correspond to the recognized intent, and determine whether to correct a confirm message included in the response message, based on a recognition rate of the intent.

According to another embodiment of the disclosure, a computer-readable recording medium has recorded thereon a computer program.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 3 is a flowchart of an operation method of an electronic device, according to an embodiment of the disclosure;

FIG. 7 is a view for explaining a method, performed by an electronic device of identifying a keyword, based on a distance change rate for each token of an input inquiry and a representative inquiry between before being input to a deep neural network model for inquiry classification and after passing through the deep neural network model according to an embodiment of the disclosure;

Throughout the drawings, it should be noted that like reference numbers are used to depict the same or similar elements, features, and structures.

MODE OF DISCLOSURE

Figure 1:
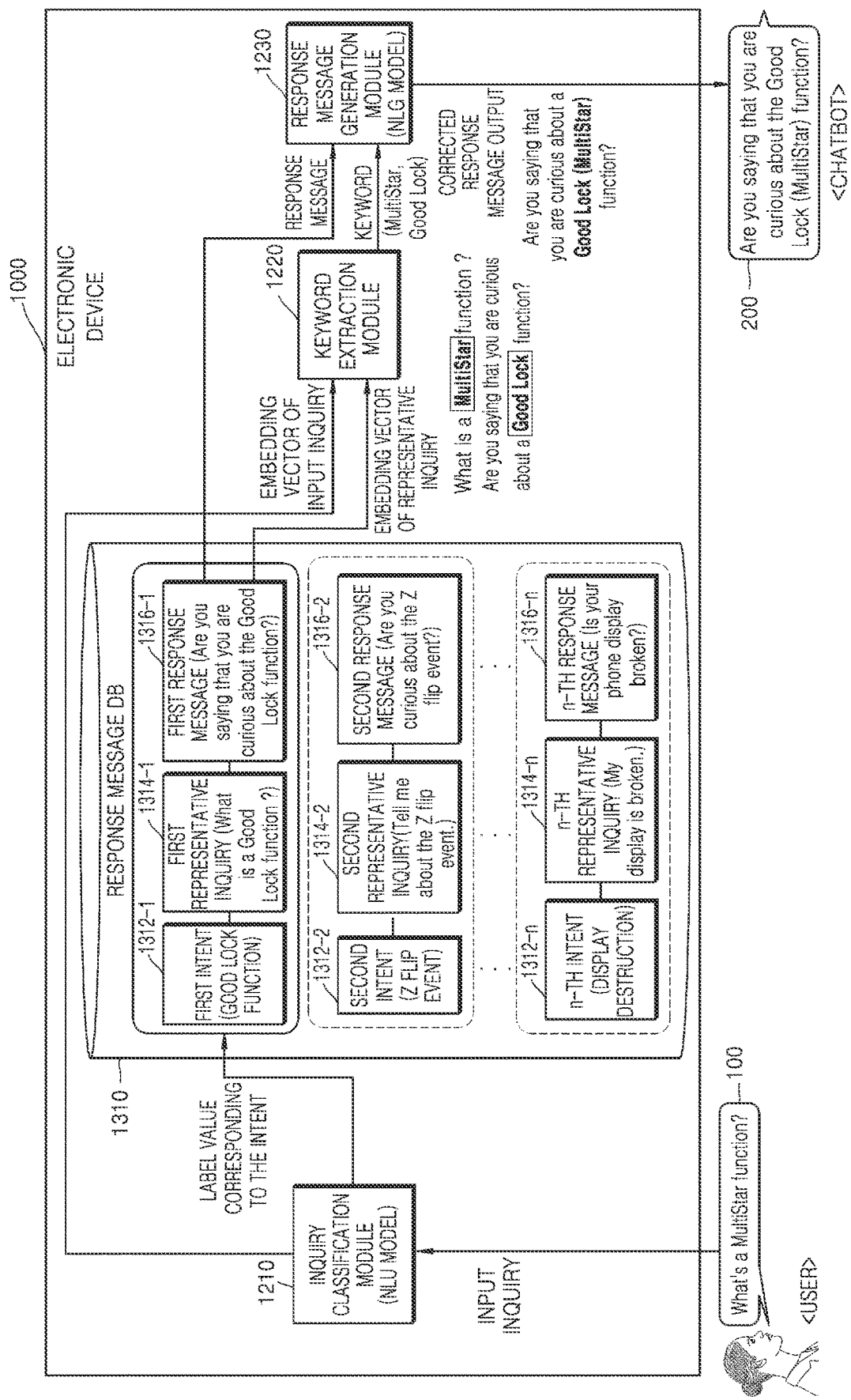
FIG. 1 is a conceptual view illustrating an operation, performed by an electronic device of processing an input inquiry of a user to output a response message according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although general terms widely used at present were selected for describing the disclosure in consideration of the functions thereof, these general terms may vary according to intentions of one of ordinary skill in the art, case precedents, the advent of new technologies, or the like. Terms arbitrarily selected by the applicant of the disclosure may also be used in a specific case. In this case, their meanings need to be given in the detailed description of an embodiment of the disclosure. Hence, the terms must be defined based on their meanings and the contents of the entire specification, not by simply stating the terms.

An expression used in the singular may encompass the expression of the plural, unless it has a clearly different meaning in the context. Unless otherwise defined, all terms (including technical and scientific terms) used herein have the same meaning as commonly understood by one of ordinary skill in the art to which this disclosure belongs.

The terms "comprises" and/or "comprising" or "includes" and/or "including" when used in this specification, specify the presence of stated elements, but do not preclude the presence or addition of one or more other elements. The terms "unit", "-er (-or)", and "module" when used in this specification refers to a unit in which at least one function or operation is performed, and may be implemented as hardware, software, or a combination of hardware and software.

The expression "configured to (or set to)" used in the disclosure may be used interchangeably with, for example, "suitable for", "having the capacity to", "designed to", "adapted to", "made to", or "capable of", according to situations. The expression "configured to (or set to)" may not only necessarily refer to "specifically designed to" in terms of hardware. Instead, in some situations, the expression "system configured to" may refer to a situation in which the system is "capable of" together with another device or parts. For example, the phrase "a processor configured (or set) to perform A, B, and C" may mean a dedicated processor (such as an embedded processor) for performing a corresponding operation, or a generic-purpose processor (such as a central processing unit (CPU) or an application processor (AP)) that can perform a corresponding operation by executing one or more software programs stored in a memory.

The term 'word' used herein is a basic unit of a language composed of at least one character string and used independently or indicating a grammatical function. The term 'string' refers to a sequence of characters, and the term 'character' refers to a symbol used to express and write a human language in a visible form. Examples of the character may include Korean alphabets, alphabets, Chinese characters, numbers, pronunciation symbols, punctuation marks, and other symbols.

The term 'word embedding' used herein refers to a method of parsing and extracting at least one word included in a text and converting the extracted at least one word into an n-dimensional embedding vector, by using a natural language processing technology.

The term 'natural language understanding (NLU) model' used herein is a model trained to obtain an intent corresponding to a text by analyzing the text. The NLU model may identify not only the intent but also information about a domain and a slot, by analyzing the text.

The term 'intent' used herein refers to information indicating an intention of a user determined by analyzing a text. The intent, which is information indicating an utterance intention of a user, may include information indicating an operation or function that the user wants to execute by using a device. The intent may be determined by analyzing the text by using the NLU model.

The intent may include not only the information indicating the utterance intention of the user but also a numerical value corresponding to the information representing the intention of the user. The numerical value is a probability value that the text is to be related to information indicating a specific intention, and may represent a confidence score at which the text may be analyzed as the specific intention. When a plurality of pieces of information indicating the intention of the user are obtained as a result of analyzing the text by using the NLU model, intention information having a maximum numerical value from among numerical values corresponding to the plurality of pieces of intention information may be determined as the intent.

FIG. 1 is a diagram illustrating an operation, performed by an electronic device of processing an input inquiry of a user to output a response message according to an embodiment of the disclosure.

Referring to FIG. 1, an electronic device 1000 receives an input inquiry 100 from the user and outputs a response message 200 for the input inquiry 100. According to an embodiment, the electronic device 1000 may be implemented as a chatbot that provides the response message 200 for the input inquiry 100. However, embodiments of the disclosure are not limited thereto.

The electronic device 1000 may be, for example, at least one of a smartphone, a tablet personal computer (PC), a mobile phone, a video phone, an e-book reader, a desktop PC, a laptop PC, a netbook computer, a personal digital assistant (PDA), a portable multimedia player (PMP), a mobile medical device, or a wearable device. However, the electronic device 1000 is not limited to the aforementioned devices.

According to an embodiment, the electronic device 1000 may be a server or a workstation. In this case, the electronic device 1000 may receive the input inquiry 100 from another electronic device, and may transmit the response message 200 to the other electronic device.

The electronic device 1000 may include an inquiry classification module 1210, a keyword extraction module 1220, a response message generation module 1230, a response message DB 1310, and a keyword list DB 1320. FIG. 1 illustrates only essential components for describing the operation of the electronic device 1000. The components included in the electronic device 1000 are not limited to those shown in FIG. 1.

The electronic device 1000 may receive the input inquiry 100 input by the user. According to an embodiment, the electronic device 1000 may directly receive the input inquiry 100 from the user. However, embodiments of the disclosure are not limited thereto, and the electronic device 1000 may receive the input inquiry 100 from a user terminal (another electronic device).

The input inquiry may include a voice signal or a text. The input inquiry 100 is input to the inquiry classification module 1210. The inquiry classification module 1210 is trained to recognize an intent for the input inquiry 100 by analyzing the input inquiry 100 and output a label value corresponding to the intent. The inquiry classification module 1210 may include an NLU model. The NLU model is an artificial intelligence (AI) model trained to obtain an intent corresponding to text by analyzing the text. According to an embodiment, the inquiry classification module 1210 may convert an input inquiry including text into an embedding vector and input the embedding vector to the NLU model to thereby classify the embedding vector into a specific intent. The inquiry classification module 1210 may output a label value corresponding to the classified intent. According to the embodiment of FIG. 1, the electronic device 1000 may convert the input inquiry 100 of "What's a MultiStar function?" into an embedding vector, recognize an intent of 'MultiStar function question' by analyzing the converted embedding vector by using the NLU model, and may obtain a label value for the recognized intent, by using the inquiry classification module 1210.

The electronic device 1000 may identify a representative inquiry that is representative of an utterance intention (intent) of the input inquiry 100 and a response message that is a response to the representative inquiry, from the response message DB 1310, by using the label value for the recognized intent. The response message DB 1310 is a database that stores representative inquiries and response messages for intents previously obtained before the input inquiry 100 is received from the user. The representative inquiry refers to an inquiry message having a largest probability (confidence) to be analyzed and classified as a specific intent. According to an embodiment, the response message DB 1310 may store a plurality of intents 1312-1, 1312-2 through 1312-n, a plurality of representative inquiries 1314-1, 1314-2 through 1314-n, and a plurality of response messages 1316-1, 1316-2 through 1316-n. The plurality of representative inquiries 1314-1 through 1314-n and the plurality of response messages 1316-1 through 1316-n may be mapped to correspond to respective label values for the plurality of intents 1312-1 through 1312-n. According to an embodiment, the plurality of representative inquiries 1314-1 through 1314-n and the plurality of response messages 1316-1 through 1316-n may be stored as key-value types with the plurality of intents 1312-1 through 1312-n in the response message DB 1310.

According to the embodiment of FIG. 1, the first intent 1312-1 may relate to 'Good Lock function', may be mapped with the first representative inquiry 1314-1 of "What is a Good Lock function?", which is a representative question representing the first intent 1312-1, and may be mapped to correspond to the first response message 1316-1 of "Are you saying that you are curious about the Good Lock function?". Similarly, the second intent 1312-2 may relate to a 'Z flip event', may be mapped with the second representative inquiry 1314-2 of "Tell me about the Z flip event.", and may be mapped to correspond to the second response message 1316-2 of "Are you curious about the Z flip event?".

The inquiry classification module 1210 may search the response message DB 1310 by using the label value corresponding to the intent, and may identify a representative inquiry mapped to correspond to the input inquiry 100. According to the embodiment of FIG. 1, the inquiry classification module 1210 may search for the first intent 1312-1 from the response message DB 1310 by using the label value recognized from the input inquiry 100, and may identify the first representative inquiry 1314-1, which is an inquiry message that is representative of the first intent 1312-1. The response message DB 1310 may output the identified first representative inquiry 1314-1 to the keyword extraction module 1220.

As the embedding vector of the input inquiry passes through the NLU model, a vector value of the embedding vector may be changed. The inquiry classification module 1210 provides the changed vector value of the embedding vector to the keyword extraction module 1220.

The keyword extraction module 1220 is configured to extract keywords from the input inquiry 100 and the representative inquiry 1314-1 input from the response message DB 1310, respectively. The keyword extraction module 1220 may extract a keyword from the input inquiry 100 by comparing the embedding vector of the input inquiry 100 with an embedding vector of the representative inquiry 1314-1. According to an embodiment, the keyword extraction module 1220 may compare a vector value of the embedding vector of the input inquiry changed between before the embedding vector of the input inquiry is input to the inquiry classification module 1210 and after the embedding vector of the input inquiry passes through the inquiry classification module 1210 with a vector value of the embedding vector of the representative inquiry 1314-1, and may extract a keyword, based on a result of the comparison. For example, as the embedding vector of the input inquiry 100 passes through the keyword extraction module 1220, the vector value of the embedding vector may be changed, and the keyword extraction module 1220 may compare a position on a virtual vector space according to the changed vector value with a position on a virtual vector space of the representative inquiry 1314-1 and may extract, as keywords, one or more words corresponding to vector values disposed at adjacent positions as a result of the comparison. A method, performed by the keyword extraction module 1220, of comparing the embedding vector of the input inquiry 100 with the embedding vector of the representative inquiry 1314-1 to identify a keyword will be described in detail with reference to FIGS. 4B, 5, 6, and 7.

Figure 2A:
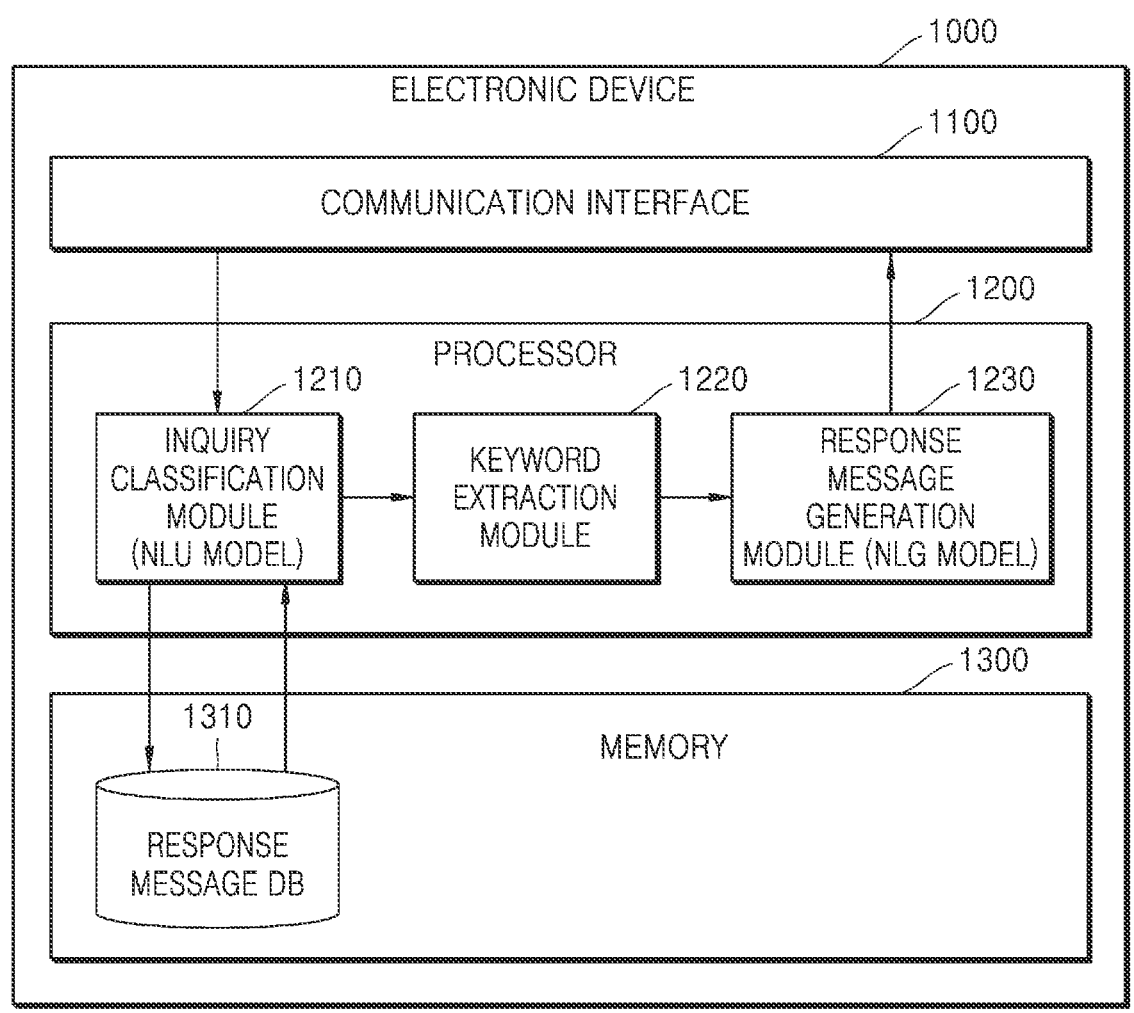
FIG. 2A is a block diagram of a structure of an electronic device according to an embodiment of the disclosure.
Figure 2B:
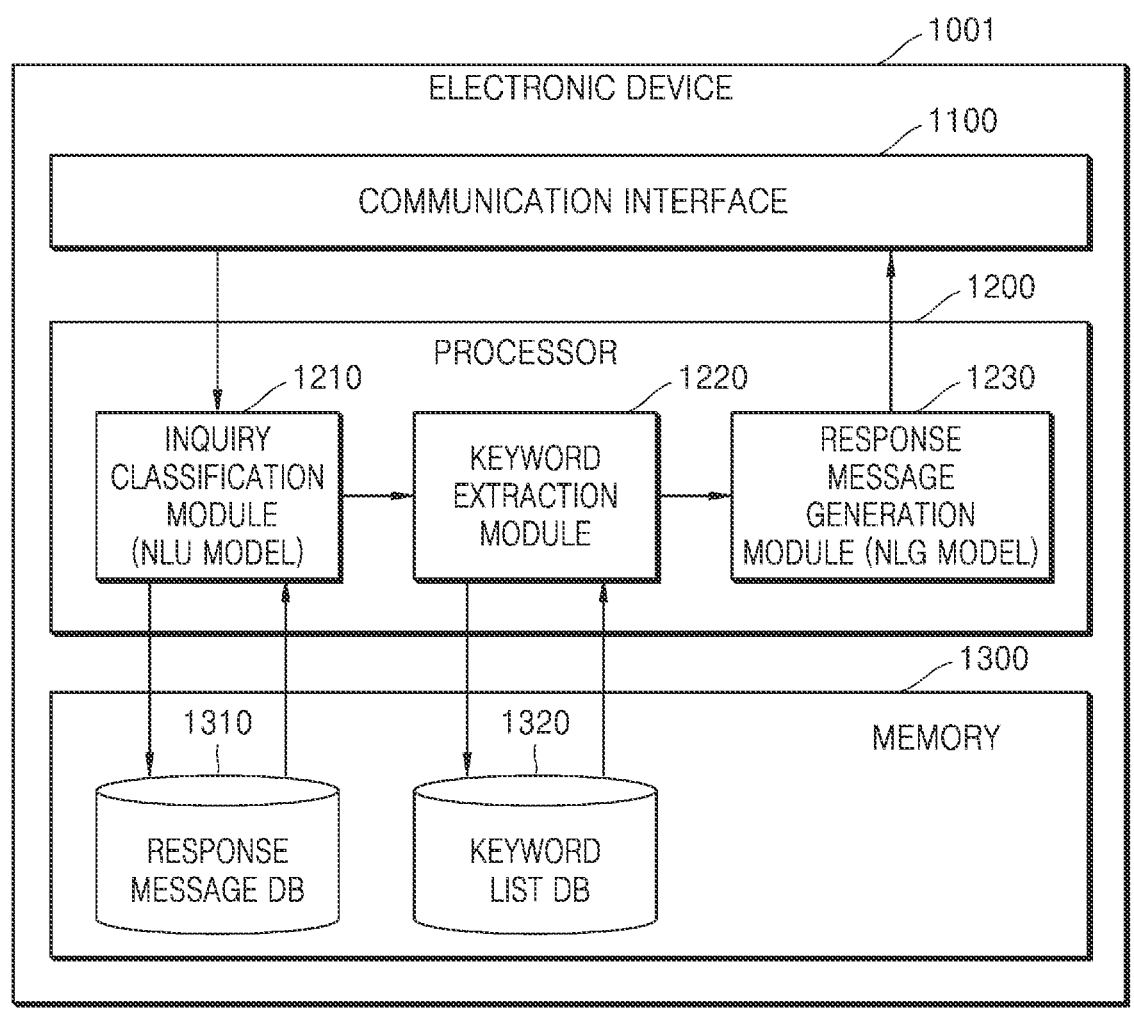
FIG. 2B is a block diagram of a structure of an electronic device according to an embodiment of the disclosure.

However, embodiments of the disclosure are not limited thereto, and the keyword extraction module 1220 may identify a keyword through the inquiry classification module 1210 before the input inquiry 100 is input, and may store the identified keyword in a keyword list DB 1320 of FIG. 2B. In this case, the inquiry classification module 1210 may include a deep neural network model trained through learning for classifying a plurality of training inquiry messages into a specific intent. According to an embodiment, the keyword extraction module 1220 may extract at least one word by parsing the input inquiry 100 in units of words, and compare the extracted at least one word with keywords pre-stored in the keyword list DB 1320, thereby extracting a keyword. An embodiment in which the keyword extraction module 1220 extracts the keyword by using the keyword list DB 1320 will be described in detail with reference to FIG. 8.

According to the embodiment of FIG. 1, the keyword extraction module 1220 may extract 'MultiStar' as a keyword from the input inquiry 100 and may extract 'Good Lock' as a keyword from the response message. The keyword extraction module 1220 provides the extracted keywords to the response message generation module 1230.

The response message generation module 1230 is configured to correct a response message by using the keywords input from the keyword extraction module 1220. The response message generation module 1230 may include a natural language generation (NLG) model. According to an embodiment, the response message generation module 1230 may correct the response message by replacing or changing a word included in the response message by using the keywords or adding the keywords to the response message. According to the embodiment of FIG. 1, the response message generation module 1230 may generate the response message 200 of "Are you saying that you are curious about the Good Lock (MultiStar) function?" by correcting the first response message 1316-1 by using the keywords 'MultiStar' and 'Good Lock'.

The electronic device 1000 may output the response message 200 corrected or generated by the response message generation module 1230. According to an embodiment, the electronic device 1000 may output the response message 200 in the form of a chatting message or acoustic signal. In this case, the electronic device 1000 may highlight a keyword included in the response message 200 by, for example, displaying the keyword in a different color so that the keyword is easy to be noticed by the eyes of the user or displaying the keyword in bold. According to an embodiment, when a mouse is put on or touches the keyword of the response message 200, the electronic device 1000 may display a description of the keyword in a pop-up form.

However, embodiments of the disclosure are not limited thereto, and the electronic device 1000 may transmit data about the response message 200 to the user terminal.

An inquiry responding system according to the related art analyzes inquiry intentions (intents) for various inquiries and outputs fixed response messages corresponding to the analyzed intents. When a response message is fixed, accurate answers to user's various queries may not be provided. For example, when an inquiry of "What is a MultiStar function?" is input, an intent for the MultiStar function may be analyzed as a 'Good Lock function inquiry', and a response message of "Are you saying that you are curious about a Good Lock function?" may be output. Thus, a user may misunderstand that the inquiry responding system does not accurately analyze the inquiry and accordingly provides a wrong response to his or her own inquiry. Thus, the user answers "No", and cannot obtain desired information (for example, information about the 'MultiStar function') from the inquiry responding system.

The electronic device 1000 according to an embodiment of the disclosure may recognize an inquiry intention (intent) for the input inquiry 100 received from the user, identify a representative inquiry and a response message according to the recognized inquiry intention, extract a keyword by comparing the embedding vector of the input inquiry 100 with the embedding vector of the representative inquiry, and correct the response message 200 by using the extracted keyword. The electronic device 1000 may provide an answer to an inquiry desired by the user, by correcting a response message to "Are you saying that you are curious about a Good Lock (MultiStar) function?" by using a keyword extracted from the input inquiry 100 of the user, for example, 'MultiStar'. In other words, the electronic device 1000 according to an embodiment of the disclosure may provide accurate information about the input inquiry 100 of the user and improving user satisfaction, by providing the response message 200 adaptively corrected with respect to the input inquiry 100 of the user.

FIG. 2A is a block diagram of a structure of an electronic device according to an embodiment of the disclosure.

Referring to FIG. 2A, the electronic device 1000 may include a communication interface 1100, a processor 1200, and a memory 1300.

The communication interface 1100 is configured to perform data transmission/reception between the electronic device 1000 and a server or another device (for example, a user terminal). The communication interface 1100 may perform data communication with the server or the other device by using at least one of wired and wireless data communication methods including, for example, Ethernet, a wired and wireless Local Area Network (LAN), Wi-Fi, Wi-Fi Direct (WFD), and Wireless Gigabit Alliance (Wi-Gig). According to an embodiment, the electronic device 1000 may include a server and may receive text data about an input inquiry from another device (for example, a user terminal) through the communication interface 1100.

Although not shown in FIG. 2A, the electronic device 1000 may further include a voice input interface and an ASR model. The voice input interface may be a device that receives a voice input such as an inquiry of the user. The voice input interface may include, for example, a microphone. The voice input interface may receive a voice input (e.g., utterance of a user) from the user through the microphone, and obtain a voice signal from the received voice input. According to an embodiment, the processor 1200 of the electronic device 1000 may receive the input inquiry of the user through the microphone, convert the received input inquiry into an acoustic signal, and obtain a voice signal by removing noise (for example, a non-voice component) from the acoustic signal.

The ASR model, which is a voice recognition model that recognizes a user's voice, is trained to convert a voice input received from the user into text and output the text. According to an embodiment, the electronic device 1000 may convert the voice input into text by using the ASR model.

Although not shown in the drawing, the electronic device 1000 may include a voice pre-processing module having a function of detecting a designated voice input (e.g., a wake-up input such as 'Hi Bixby' or 'Ok Google') or a function of pre-processing a voice signal obtained from some voice inputs.

The processor 1200 is configured to control the electronic device 1000 to perform operations and/or functions, by reading and executing one or more instructions or program code. The instructions or program code executed by the processor 1200 are stored in the memory 1300, and the processor 1200 may execute instructions or program code loaded from the memory 1300. However, embodiments of the disclosure are not limited thereto. The processor 1200 may itself include instructions or program code.

The processor 1200 may include hardware components that perform arithmetic, logic, input/output operations and signal processing. The processor 1200 may include, but is not limited to, at least one of a central processing unit, a microprocessor, a graphics processing unit, application specific integrated circuits (ASICs), digital signal processors (DSPs), digital signal processing devices (DSPDs), programmable logic devices (PLDs), or field programmable gate arrays (FPGAs).

Instructions and program code readable by the processor 1200 may be stored in the memory 1300. The memory 1300 may include at least one type of storage medium from among, for example, a flash memory type storage medium, a hard disk type storage medium, a multimedia card micro type storage medium, a card type memory (for example, SD or XD memory), a random access memory (RAM), a static RAM (SRAM), a read-only memory (ROM), an electrically erasable programmable ROM (EEPROM), a programmable ROM (PROM), a magnetic memory, a magnetic disk, and an optical disk.

The processor 1200 may include the inquiry classification module 1210, the keyword extraction module 1220, and the response message generation module 1230.

The inquiry classification module 1210 is trained to recognize an intent for the input inquiry of the user received from the communication interface 1100 by analyzing the input inquiry of the user and classify the input inquiry according to the intent. According to an embodiment, the inquiry classification module 1210 may include an NLU model. The inquiry classification module 1210 may be implemented as a deep neural network model trained before the time point when the input inquiry is received from the user. According to an embodiment, the deep neural network model may be trained through supervised learning that applies each of embedding vectors for a plurality of training inquiry messages previously obtained for training as an input and applies a label value for the intent as output groundtruth. The plurality of training inquiry messages may include inquiry messages having a representative inquiry classifiable into a specific intent and an inquiry message with a word or phrase paraphrased to be interpretable as the representative inquiry.

The deep neural network model may be implemented as, for example, a convolutional neural network (CNN), but embodiments of the disclosure are not limited thereto. According to an embodiment, the deep neural network model may be implemented as all well-known deep learning-based neural network models such as a Recurrent Neural Network (RNN), a Restricted Boltzmann Machine (RBM), a Deep Belief Network (DBN), a Bidirectional Recurrent Deep Neural Network (BRDNN), and Deep Q-Networks.

The processor 1200 may execute instructions or program code associated with the inquiry classification module 1210 to analyze the input inquiry, recognize the intent associated with the input inquiry, and obtain the label value corresponding to the intent. According to an embodiment, the processor 1200 may parse text included in the input inquiry in units of morphemes, words, or phrases, convert the parsed text into an embedding vector by using linguistic features (e.g., grammatical elements) of morphemes, words, or phrases, and output a specific intent by applying the embedding vector as an input to the deep neural network model, by using the NLU model of the inquiry classification module 1210.

According to an embodiment, the processor 1200 may obtain at least one intent candidate, based on a probability value that information indicating an utterance intention of the user is predicted as the specific intent, by analyzing the input inquiry. The probability value may refer to a confidence score. The at least one intent candidate obtained by the processor 1200 analyzing the input inquiry by using the inquiry classification module 1210 may be a N-Best candidate having a confidence score that exceeds a preset threshold. According to an embodiment, the processor 1200 may determine an intent candidate having a highest probability value, that is, a highest confidence score, from among the at least one intent candidate, as the intent for the input inquiry.

For example, when the input inquiry is "What's a MultiStar function?", the processor 1200 may obtain at least one intent candidate by using the inquiry classification module 1210. For example, the processor 1200 may obtain intent candidates of 'Good lock function inquiry' and 'Multimedia function inquiry'. The processor 1200 may determine 'Good Lock function inquiry' having a maximum probability value from among the at least one intent candidate as the intent of the input inquiry, and may obtain the label value for the intent.

The processor 1200 may search for the intent corresponding to the label value obtained through the inquiry classification module 1210 from the response message DB 1310, and may identify a representative inquiry mapped to correspond to a found intent and a response message for the representative inquiry.

The response message DB 1310 is a database that stores representative inquiries and response messages for intents previously obtained before the input inquiry is received from the user. According to an embodiment, the response message DB 1310 stores a plurality of intents, a plurality of representative inquiries, and a plurality of response messages. The plurality of representative inquiries and the plurality of response messages may be mapped to correspond to respective label values of the plurality of intents. According to an embodiment, the plurality of intents, the plurality of representative inquiries, and the plurality of response messages may be stored as a key-value type in the response message DB 1310.

Referring to FIGS. 1 and 2A, the processor 1200 may search the response message DB 1310 by using a label value for the first intent 1312-1 of FIG. 1 recognized from the input inquiry 100 of FIG. 1 through the inquiry classification module 1210, and may identify the first representative inquiry 1314-1 mapped to correspond to the first intent 1312-1 of FIG. 1 and the first response message 1316-1 of FIG. 1 mapped as a response message for the first representative inquiry 1314-1 as a result of the searching. The processor 1200 may provide the identified first representative inquiry 1314-1 and the input inquiry to the keyword extraction module 1220. The processor 1200 may provide the identified first response message 1316-1 to the response message generation module 1230.

The keyword extraction module 1220 is configured to extract a keyword from the input inquiry by comparing an embedding vector of the input inquiry with an embedding vector of the representative inquiry received from the response message DB 1310. The keyword extraction module 1220 may receive an embedding vector of the input inquiry changed by passing through the inquiry classification module 1210, and may compare a vector value of the embedding vector of the input inquiry with a vector value of the embedding vector of the representative inquiry received from the response message DB 1310 to thereby extract a keyword from the input inquiry.

As the embedding vector of the input inquiry passes through the inquiry classification module 1210, the vector value of the embedding vector may be changed. According to an embodiment, the keyword extraction module 1220 may compare a position on a virtual vector space according to the changed vector value of the embedding vector of the input inquiry with a position on a virtual vector space of the embedding vector of the representative inquiry, and may extract, as keywords, one or more words corresponding to vector values disposed at adjacent positions as a result of the comparison. According to an embodiment, the processor 1200 may execute instructions or program code associated with the keyword extraction module 1220 to compare a position on a virtual vector space according to a changed vector value of a first embedding vector for one or more words included in the input inquiry with a position on a virtual vector space of a second embedding vector of the representative inquiry to identify a keyword from the input inquiry.

According to an embodiment, the processor 1200 may calculate a cosine similarity between the first embedding vector and the second embedding vector adjacent to each other on a virtual vector space, and may identify a keyword, based on position proximity on the virtual vector space of embedding vectors and the calculated cosine similarity. According to another embodiment, the processor 1200 may identify a keyword, based on a distance change rate on a virtual vector space between the first embedding vector of the input inquiry and the second embedding vector of the representative inquiry.

A method, performed by the processor 1200, of identifying a keyword by comparing the first embedding vector of the input inquiry having passed through the inquiry classification module 1210 with the second embedding vector of the representative inquiry will be described in detail with reference to FIGS. 4B, 5, 6, and 7.

The processor 1200 may provide information about the keyword extracted by the keyword extraction module 1220 to the response message generation module 1230.

The response message generation module 1230 is configured to correct the response message by using the keyword received from the keyword extraction module 1220. The response message generation module 1230 may include an NLG model. According to an embodiment, the processor 1200 may execute instructions or program code associated with the response message generation module 1230 to replace or change a word included in the response message by using the keyword or adding the keyword to the response message to thereby correct the response message. According to an embodiment, the processor 1200 may generate a confirm message that confirms the inquiry intention of the user for the input inquiry. Referring to FIGS. 1 and 2A, the processor 1200 may generate a confirm message of "Are you saying that you are curious about the Good Lock (MultiStar) function?" by correcting the first response message 1316-1 by using 'MultiStar' and 'Good Lock' extracted as keywords.

According to an embodiment, the processor 1200 may generate an answer start message including at least one of additional information or additional explanation associated with the keyword and may add the generated answer start message to the response message, by using the response message generation module 1230. For example, the processor 1200 may generate an answer start message associated with the keywords 'MultiStar' and 'Good Lock', such as "MultiStar is one of the functions of Good Lock.", and may add the generated answer start message to the response message.

According to an embodiment, the processor 1200 may determine whether to correct the confirm message included in the response message, based on a recognition rate of the intent recognized from the input inquiry through the inquiry classification module 1210. When the intent recognition rate is equal to or greater than a preset threshold, the processor 1200 may add the confirm message to the response message. When the intent recognition rate is less than the preset threshold, the processor 1200 may correct or change the confirm message by using the keyword, and may add the corrected or changed confirm message to the response message. An embodiment in which the processor 1200 corrects the response message, based on the intent recognition rate, will be described in detail with reference to FIG. 11.

The processor 1200 provides the response message generated or corrected by the response message generation module 1230 to the communication interface 1100. The communication interface 1100 may transmit data about the response message to another device (for example, a user terminal).

However, embodiments of the disclosure are not limited thereto. According to an embodiment, the electronic device 1000 may further include a display, and may output, on the display, the response message generated or corrected by the response message generation module 1230. According to an embodiment, the electronic device 1000 may highlight and display a keyword included in the response message by, for example, displaying the keyword in a different color so that the keyword is easy to be noticed by the eyes of the user or displaying the keyword in bold. According to an embodiment, when a mouse is put on or touches the keyword of the response message, the electronic device 1000 may display a description of the keyword in a pop-up form.

The memory 1300 may include the response message DB 1310. The response message DB 1310 may be a non-volatile memory. The non-volatile memory refers to a storage medium that may store and maintain information even when power is not supplied and may use the stored information again when power is supplied. The non-volatile memory may include, for example, at least one of a flash memory, a hard disk, a solid state drive (SSD), a multimedia card micro type, and a card type memory (e.g., SD or XD memory), a ROM, a magnetic memory, a magnetic disk, or an optical disk.

FIG. 2A illustrates that the response message DB 1310 is included in the memory 1300, but embodiments of the disclosure are not limited thereto. According to an embodiment, the response message DB 1310 may be included as a database separate from the memory 1300. According to another embodiment, the response message DB 1310 is a component of an external device or external server other than the electronic device 1000, and thus may be connected to the electronic device 1000 through the communication interface 1100 via wired and wireless communication.

FIG. 2B is a block diagram of a structure of an electronic device according to an embodiment of the disclosure.

Referring to FIG. 2B, an electronic device 1001 may include a communication interface 1100, a processor 1200, and a memory 1300. The electronic device 1001 of FIGS. 2A and 2B is the same as the electronic device 1000 of FIG. 2A except that the memory 1300 further includes a keyword list DB 1320, and thus descriptions of the electronic device 1001 of FIG. 2B that are the same as those of the electronic device 1000 of FIG. 2A will be omitted.

The processor 1200 may identify a keyword by using the inquiry classification module 1210 including a deep neural network model previously trained before an input inquiry is input, and may store the identified keyword in the keyword list DB 1320. According to an embodiment, the processor 1200 may identify the keyword, based on a vector value of an embedding vector changed while the deep neural network model of the inquiry classification module 1210 is performing a training process of classifying a plurality of training inquiry messages into a specific intent. A method, performed by the processor 1200, of identifying the keyword while the deep neural network model is being trained will be described in detail with reference to FIG. 8.

The keyword extraction module 1220 may extract a keyword from the input inquiry by comparing the input inquiry and the response message with the keywords previously stored in the keyword list DB 1320. According to an embodiment, the processor may execute the instructions or program code associated with the keyword extraction module 1220 to extract at least one word by parsing the input inquiry in units of words, and compare the extracted at least one word with the keywords pre-stored in the keyword list DB 1320. The processor 1200 may extract the same word as a result of the comparison with the keyword list DB 1320 as a keyword for the input inquiry.

The keyword list DB 1320 stores keywords extracted by the processor 1200 in a list form. The keyword list DB 1320 may be a non-volatile memory. A description of the non-volatile memory is the same as that of the response message DB 1310 of FIG. 2A, and thus will not be repeated herein.

FIG. 2B illustrates that the response message DB 1310 and the keyword list DB 1320 are both included in the memory 1300, but embodiments of the disclosure are not limited thereto. According to an embodiment, at least one of the response message DB 1310 or the keyword list DB 1320 may be included as a separate database from the memory 1300. According to another embodiment, at least one of the response message DB 1310 or the keyword list DB 1320 is a component of an external device or external server other than the electronic device 1000, and thus may be connected to the electronic device 1000 through the communication interface 1100 via wired and wireless communication.

FIG. 3 is a flowchart of an operation method of the electronic device 1000 according to an embodiment of the disclosure.

In operation S310, the electronic device 1000 receives an input inquiry input by a user. According to an embodiment, the electronic device 1000 may include a server and may receive text data about the input inquiry from another device (for example, a user terminal). However, embodiments of the disclosure are not limited thereto, and the electronic device 1000 may receive an input inquiry in a text form directly from a user or may receive a voice input.

According to an embodiment, the electronic device 1000 may receive an input inquiry formed in a voice signal form from the user through a microphone. In this case, the electronic device 1000 may include an ASR model and may convert a voice signal into text by using the ASR model.

In operation S320, the electronic device 1000 may identify a representative inquiry mapped to correspond to an intent of the input inquiry, by analyzing the input inquiry by using an NLU model. According to an embodiment, the electronic device 1000 may recognize the intent of the input inquiry and obtain a label value corresponding to the recognized intent, by analyzing the input inquiry by using the NLU model. According to an embodiment, the electronic device 1000 may convert the input inquiry into a first embedding vector by using an embedding module, and may identify the intent of the input inquiry by inputting the first embedding vector to the NLU model. According to an embodiment, the electronic device 1000 may search for an intent corresponding to the obtained label value from the response message DB 1310 of FIGS. 2A and 2B, and may identify a representative inquiry mapped to correspond to a found intent.

The response message DB 1310 is a database that stores response messages for intents previously obtained before the input inquiry is received from the user. According to an embodiment, the response message DB 1310 stores a plurality of intents, a plurality of representative inquiries, and a plurality of response messages. The response message DB 1310 is the same as that described above with reference to FIG. 2A, and thus a redundant description thereof will be omitted.

In operation S330, the electronic device 1000 compares a vector value of the first embedding vector of the input inquiry changed during identification of the representative inquiry through the NLU model with a vector value of a second embedding vector of the representative inquiry. During the intent identification in operation S320, the vector value of the first embedding vector may change between before the input inquiry is input to the NLU model and after the input inquiry passes through the NLU model. The electronic device 1000 may compare the vector value of the first embedding vector changed by passing through the NLU model with the vector value of the second embedding vector of the representative inquiry. According to an embodiment, the electronic device 1000 may ascertain a position relationship between the first embedding vector and the second embedding vector on a virtual vector space according to the respective vector values of the first embedding vector and the second embedding vector. According to an embodiment, the electronic device 1000 may ascertain a change in a position on a virtual vector space according to the changed vector value by comparing before the first embedding vector is input to the NLU model with after the first embedding vector passes through the NLU model.

In operation S340, the electronic device 1000 extracts a keyword from the input inquiry, based on a result of the comparison. According to an embodiment, the electronic device 1000 may identify a keyword from the input inquiry, based on a position relationship on a virtual vector space according to the vector value of the first embedding vector for one or more words included in the input inquiry changed by the NLU model and the vector value of the second embedding vector of the representative inquiry. According to an embodiment, the electronic device 1000 may calculate a cosine similarity between embedding vectors adjacent to each other on the virtual vector space, and may identify a keyword, based on position proximity on the virtual vector space of the embedding vectors and the calculated cosine similarity. According to another embodiment, the electronic device 1000 may identify the keyword, based on a distance change rate between the first embedding vector and the second embedding vector on the virtual vector space according to the changed vector value of the first embedding vector during the intent identification by the NLU model.

In operation S350, the electronic device 1000 corrects a response message by using the extracted keyword. According to an embodiment, the electronic device 1000 may correct the response message by replacing or changing a word included in the response message by using the extracted keyword or adding the keyword to the response message. According to an embodiment, the electronic device 1000 may generate a confirm message that confirms an inquiry intention of the user for the input inquiry, and may add the generated confirm message to the response message. According to an embodiment, the electronic device 1000 may generate an answer start message including at least one of additional information or additional explanation associated with the keyword and may add the generated answer start message to the response message.

Figure 4A:
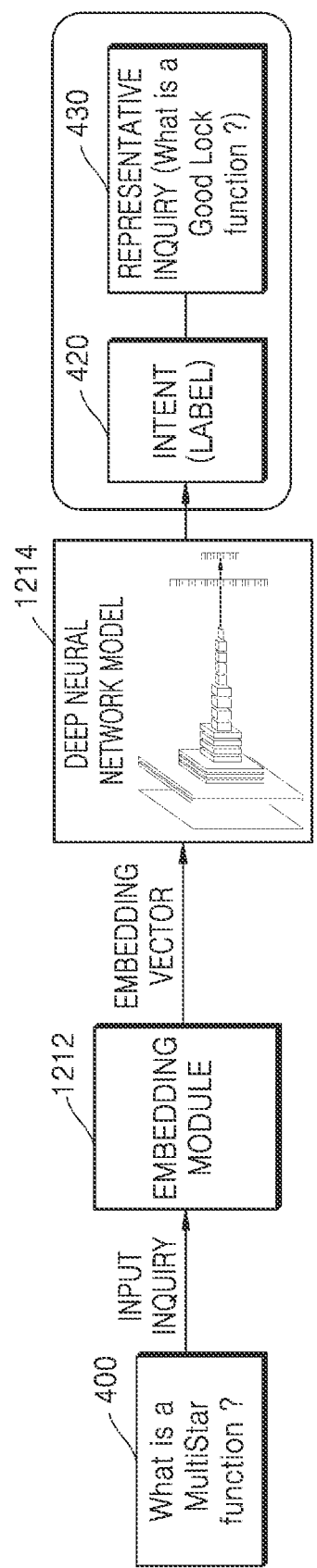
FIG. 4A is a block diagram for explaining a method, performed by an electronic device of identifying an intent and a representative inquiry from an input inquiry by using an inquiry classification module according to an embodiment of the disclosure.

FIG. 4A is a block diagram for explaining a method, performed by an electronic device, of identifying an intent (i.e., label value 420) and a representative inquiry from an input inquiry by using an inquiry classification module, according to an embodiment of the disclosure.

Referring to FIG. 4A, the inquiry classification module may include an embedding module 1212 and a deep neural network model 1214. The electronic device 1000 may input the input inquiry 400 received from a user to the embedding module 1212, and may convert the input inquiry 400 into an embedding vector. The embedding module 1212 is a module that parses input text to at least one word, extracts the at least one word, and quantifies the extracted at least one word to a vector. The embedding module 1212 may convert the at least one word into an embedding vector by using, for example, a well-known machine learning model such as word2vec, global vectors (GloVe), or onehot coding. However, an embedding model used by the embedding module 1212 is not limited to the enumerated models.

The processor 1200 of FIG. 2A of the electronic device 1000 may extract at least one word by parsing the input inquiry 400 in units of words by using the embedding module 1212, and may convert the extracted at least one word into an embedding vector. The embedding vector is input to the deep neural network model 1214.

The deep neural network model 1214 is an AI model trained to output a label value 420 for the intent from the embedding vector received from the embedding module 1212. According to an embodiment, the deep neural network model 1214 may be trained through supervised learning that uses, as an input, a plurality of embedding vectors into which a plurality of training inquiry messages previously obtained for training are converted and uses, as groundtruth, label values for specific intents into which the plurality of training inquiry messages are classified. The label value for the specific intent refers to a preset numerical value for the specific intent. The deep neural network model 1214 may be trained before the input inquiry 400 is input.

According to an embodiment, the deep neural network model 1214 may include a plurality of hidden layers which are internal layers performing arithmetic operations. The deep neural network model 1214 may be an AI model such as a Convolutional Neural Network (CNN), a Recurrent Neural Network (RNN), a Restricted Boltzmann Machine (RBM), a Deep Belief Network (DBN), a Bidirectional Recurrent Deep Neural Network (BRDNN), or Deep Q-Networks. However, the deep neural network model 1214 is not limited to the aforementioned AI models, and may be implemented as any of all well-known deep learning-based network models.

In response to the embedding vector into which the input inquiry 400 is converted, the deep neural network model 1214 outputs the label value 420 corresponding to the intent into which the input inquiry 400 may be classified. When the label value 420 of the intent is output, the processor 1200 may identify the representative inquiry 430 mapped to correspond to the output label value 420. The representative inquiry 430 refers to an inquiry message having a largest probability (confidence) to be analyzed and classified as a specific intent. For example, the representative inquiry 430 that may be classified into an intent of 'Inquiry about a Good Lock function' may be "What is a Good Lock function?". The representative inquiry 430 mapped with the label value 420 of the intent may be pre-stored in the response message DB 1310 of FIGS. 2A and 2B. The representative inquiry 430 may be stored in a text form in the response message DB 1310, but embodiments of the disclosure are not limited thereto. According to an embodiment, the representative inquiry 430 may be stored in the form of an embedding vector in the response message DB 1310.

According to the embodiment of FIG. 4A, the input inquiry 400 of "What's a MultiStar function?" may be converted into an embedding vector by the embedding module 1212, and the embedding vector may pass through the deep neural network model 1214 and thus the label value 420 corresponding to the intent for 'Good Lock function' may be output. The processor 1200 of the electronic device 1000 may identify "What is a Good Lock function?", which is the representative inquiry 430 mapped to correspond to the label value 420 corresponding to the intent of 'Good Lock function', from the response message DB 1310.

Figure 4B:
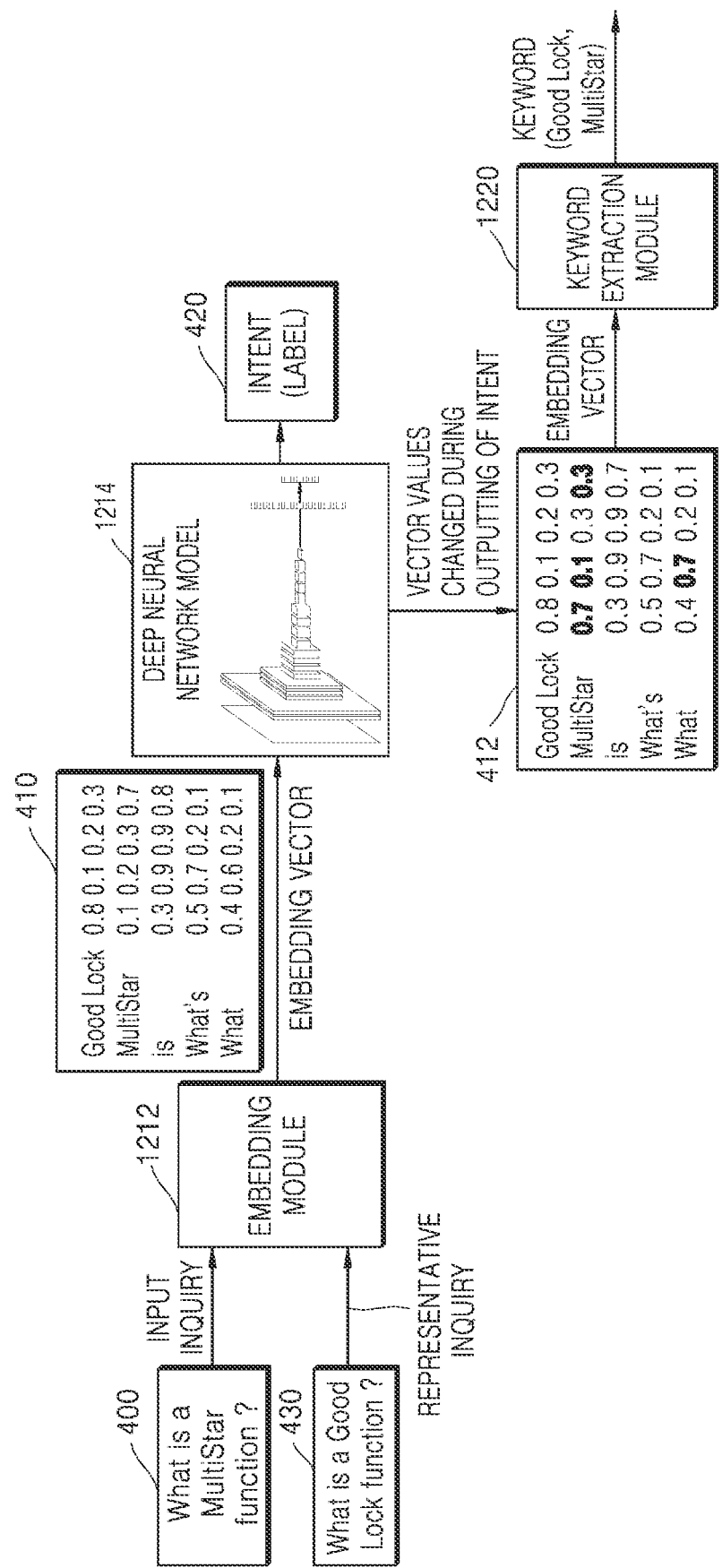
FIG. 4B is a block diagram for explaining a method, performed by an electronic device of extracting a keyword from an input inquiry and a representative inquiry by using a keyword extraction module according to an embodiment of the disclosure.

FIG. 4B is a block diagram for explaining a method, performed by an electronic device, of extracting a keyword from an input inquiry and a representative inquiry by using a keyword extraction module, according to an embodiment of the disclosure. An embedding module 1212 and a deep neural network model 1214 of FIG. 4B are the same as the embedding module 1212 and the deep neural network model 1214 of FIG. 4A, and thus redundant descriptions thereof will be omitted.

Referring to FIG. 4B, the electronic device 1000 may input the input inquiry 400 and the representative inquiry 430 to the embedding module 1212, and may convert the input inquiry 400 and the representative inquiry 430 into embedding vectors, respectively, by using the embedding module 1212. FIG. 4B illustrates the single input inquiry 400 and the single representative inquiry 430, but this is merely an example. Embodiments of the disclosure are not limited thereto. A single input inquiry 400 and/or a single representative inquiry 430 may be included, or a plurality of input inquiries 400 and/or a plurality of representative inquiries 430 may be included. According to an embodiment, the processor 1200 of FIG. 2A of the electronic device 1000 may extract at least one word by parsing the input inquiry 400 and the representative inquiry 430 in units of words and may convert the extracted at least one word into an embedding vector, by using the embedding module 1212. According to the embodiment of FIG. 4B, the processor 1200 may extract words 'MultiStar' and 'What's' from the input inquiry 400 and may extract words 'Good Lock', 'is', and 'What' from the representative inquiry 430. For example, the processor 1200 may convert 'Good Lock' into a vector value [0.8, 01, 0.2, 0.3], 'MultiStar' into a vector value [0.1, 0.2, 0.3, 0.07], 'is' into a vector value [0.3, 0.9, 0.9, 0.8], 'What' into a vector value [0.5, 0.7, 0.2, 0.1], and 'What's' into a vector value [0.4, 0.6, 0.2, 0.1]. The dimension and the vector value of the embedding vector are examples for convenience of explanation, and embedding vectors according to embodiments of the disclosures are not limited to the vector values shown in FIG. 4B.

According to an embodiment, the processor 1200 may convert the input inquiry 400 into a first embedding vector and may convert the input inquiry (i.e., representative inquiry 430) into a second embedding vector. The processor 1200 may form an embedding vector 410 by arranging the vector values of one or more words included in the first embedding vector and the second embedding vector in a matrix form. The processor 1200 may input the embedding vector 410 to the deep neural network model 1214. In this case, the embedding vector 410 becomes a feature vector input to the deep neural network model 1214.

The deep neural network model 1214 is an AI model configured to perform a training using the embedding vector 410 provided by the embedding module 1212.

When the deep neural network model 1214 is implemented as a CNN model, the deep neural network model 1214 may extract feature values from the embedding vector 410 used as an input by using a filter having a preset size and a preset number of channels, obtain a plurality of layers including the extracted feature values, and obtain a feature vector map by applying a weight to the plurality of layers. A rectified linear unit (ReLU) model may be used in the process of obtaining the feature vector map, a learning model may be regularized via drop out in order to improve efficiency, and operations of performing pooling or max pooling may be further added. Then, feature values obtained via pooling or max pooling may be incorporated through a fully connected layer, and may be trained to output a label associated with a compression rate value via an activation function including softmax, sigmoid, and hyperbolic tangent.

In a process of outputting an intent through the deep neural network model 1214, vector values of the embedding vector 410 may be changed. Before the embedding vector 410 is input to the deep neural network model 1214, vector values of the embedding vector 410 for extracted words are different from one another due to recognition of the extracted words as unrelated words. However, while the embedding vector 410 is passing through the deep neural network model 1214, extracted words may be classified into the same intent, and thus vectors values of the embedding vector 412 of related words may be changed to similar values. According to the embodiment of FIG. 4B, because 'Good Lock' and 'MultiStar' are unrelated words before they are input to the deep neural network model 1214, the vector values of the embedding vector 410 embedded by the embedding module 1212 are also different from one another as being [0.8, 0.1, 0.2, 0.3] and [0.1, 0.2, 0.3, 0.7]. However, after passing through the deep neural network model 1214, the vector value of the embedding vector 412 for 'MultiStar' may be changed to [0.7, 0.1, 0.3, 0.3].

As the vector value of the embedding vector 412 is changed, a position on the virtual vector space may be changed. The keyword extraction module 1220 is configured to receive the vector value of the embedding vector 412 from the deep neural network model 1214, and extract a keyword, based on a position relationship on a virtual vector space according to the vector value of the embedding vector 412 changed as passing through the deep neural network model 1214. According to the embodiment of FIG. 4B, the keyword extraction module 1220 may extract 'Good Lock' and 'MultiStar' as keywords, based on the position relationship on the virtual vector space according to the vector value of the embedding vector 412 changed as passing through the deep neural network model 1214. A method, performed by the keyword extraction module 1220, of extracting a keyword, based on the position relationship on the virtual vector space according to the vector value of the embedding vector 412 will now be described in detail with reference to FIG. 5.

Figure 5:
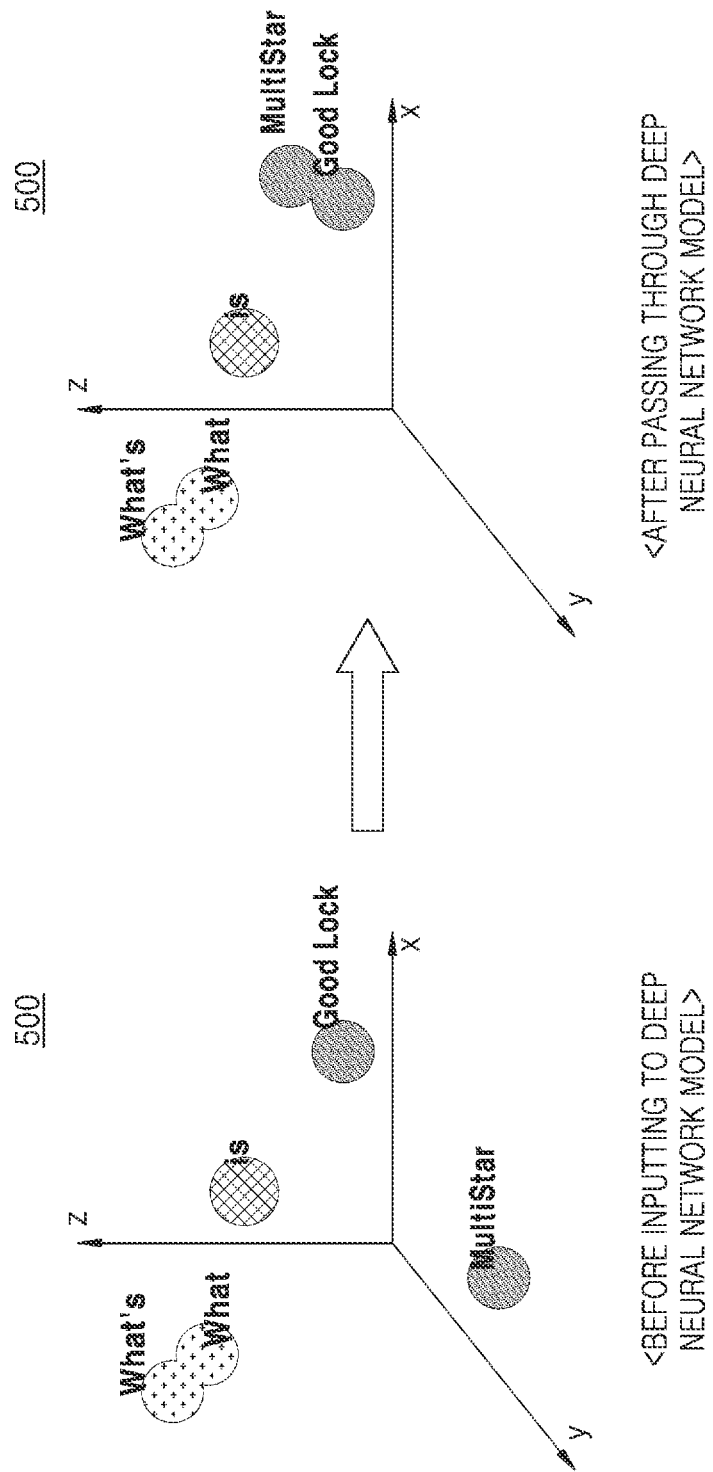
FIG. 5 is a view for explaining a method, performed by an electronic device of identifying a keyword, based on a position relationship in a virtual vector space according to a vector value of an embedding vector changed between before being input to a deep neural network model and after passing through the deep neural network model according to an embodiment of the disclosure.

FIG. 5 is a view for explaining a method, performed by an electronic device, of identifying a keyword, based on a position relationship on a virtual vector space according to a vector value of an embedding vector changed between before being input to a deep neural network model and after passing through the deep neural network model, according to an embodiment of the disclosure.

Referring to FIG. 5, a position relationship according to vector values of respective embedding vectors of words on a virtual vector space 500 is illustrated. Although the virtual vector space 500 is illustrated as a three-dimensional (3D) space, this is merely for convenience of explanation. The dimensions and vector values of the embedding vectors are not limited to those shown in FIG. 5.

Before embedding vectors are input to the deep neural network model 1214 of FIGS. 4A and 4B, embedding vectors for words 'What is' and 'What's' may be adjacent to each other on the virtual vector space 500 according to vector values of the embedding vectors, and embedding vectors for 'Good Lock' and 'MultiStar' may be far from each other on the virtual vector space 500.

After the embedding vectors pass through the deep neural network model 1214 to recognize an intent, positions of the embedding vectors of words 'What' and 'What's' on the virtual vector space 500 may be the same as those before the embedding vectors are input to the deep neural network model 1214, but positions of the embedding vectors for 'Good Lock' and 'MultiStar' on the virtual vector space 500 may be changed to be adjacent to each other. This is because, after the embedding vectors pass through the deep neural network model 1214, the vector value of the embedding vector of 'MultiStar' is changed to be similar to that of the embedding vector of 'Good Lock'.

The keyword extraction module 1220 of FIG. 4B is configured to extract a keyword from the input inquiry, based on a position relationship on the virtual vector space 500 according to the changed vector values of the embedding vectors of one or more words included in each of the input inquiry and the representative inquiry by training of the deep neural network model 1214. According to an embodiment, the processor 1200 of FIGS. 2A and 2B of the electronic device 1000 may execute instructions or program code associated with the keyword extraction module 1220 to identify embedding vectors of which vector values have been changed during intent recognition by the deep neural network model 1214, and may extract a keyword, based on a position relationship between the embedding vectors. According to an embodiment, the processor 1200 may extract, as keywords, words corresponding to embedding vectors changed to be adjacent to each other on the virtual vector space 500. According to the embodiment of FIG. 5, the processor 1200 may extract, as keywords, words 'MultiStar' and 'Good Lock' having positions on the virtual vector space 500 changed during the intent recognition by the deep neural network model 1214 and corresponding to the embedding vectors arranged adjacent to each other.

The processor 1200 may not only change the position relationship between the embedding vectors but also measure a cosine similarity, or may identify a keyword, based on a distance change rate on the virtual vector space 500, and may extract the identified keyword. This embodiment will now be described in detail with reference to FIGS. 6 and 7.

Figure 6:
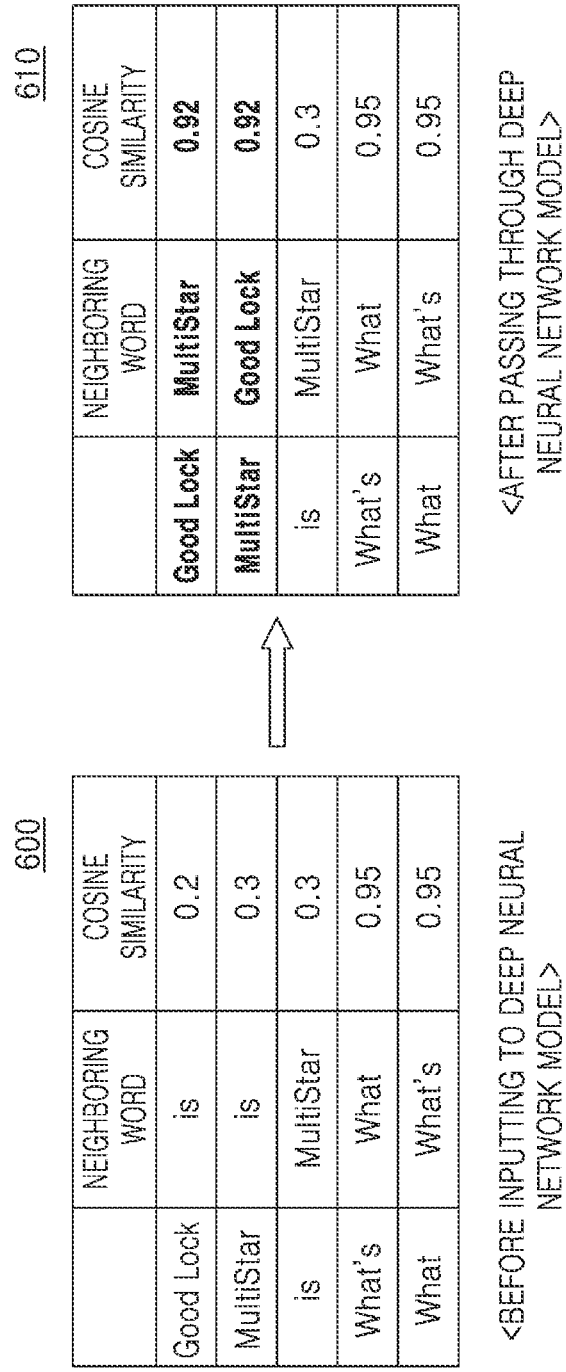
FIG. 6 is a view for explaining a method, performed by an electronic device of identifying a keyword, based on a position relationship in a virtual vector space according to a vector value of an embedding vector changed between before being input to a deep neural network model and after passing through the deep neural network model and a cosine similarity according to an embodiment of the disclosure.

FIG. 6 is a view for explaining a method, performed by an electronic device, of identifying a keyword, based on a position relationship on a virtual vector space according to a vector value of an embedding vector changed between before being input to a deep neural network model and after passing through the deep neural network model and a cosine similarity, according to an embodiment of the disclosure.

Referring to FIG. 6, a table 600 illustrates position proximity and cosine similarity between the embedding vectors of words before being input to a deep neural network model for intent recognition and a table 610 showing position proximity and cosine similarity between the embedding vectors of words after passing through the deep neural network model. Referring to the table 600 before embedding vectors are input to the deep neural network model 1214 of FIGS. 4A and 4B, the embedding vector of 'Good Lock' is located closest to the embedding vector of 'is' on a virtual vector space, and the embedding vector of 'MultiStar' is also located closest to the embedding vector of 'is'. A cosine similarity between the embedding vector of 'Good Lock' and the embedding vector of 'is' is 0.2, and a cosine similarity between the embedding vector of 'MultiStar' and the embedding vector of 'is' is 0.3.

Referring to the table 610 after embedding vectors pass through the deep neural network model 1214 to achieve intent recognition, an embedding vector located closest to the embedding vector of 'Good Lock' on the virtual vector space is the embedding vector of 'MultiStar'. Similarly, after embedding vectors pass through the deep neural network model 1214, an embedding vector located closest to the embedding vector of 'MultiStar' on the virtual vector space is the embedding vector of 'Good Lock'. A cosine similarity between the embedding vector of 'Good Lock' and the embedding vector of 'MultiStar' is calculated as 0.92.

The cosine similarity refers to a similarity between vectors that may be calculated using a cosine angle between embedding vectors. When two embedding vectors have completely the same directions, a cosine similarity therebetween has a value of 1. When two embedding vectors have an angle of 90°, a cosine similarity therebetween has a value of 0. When two embedding vectors have an angle of 180°, a cosine similarity therebetween has a value of −1. In other words, the cosine similarity may be calculated as a value ranging from −1 to 1, and as the value of the cosine similarity is closer to 1, it may be determined that the similarity between vectors is high.

The processor 1200 of FIGS. 2A and 2B may execute instructions or program code associated with the keyword extraction module 1220 of FIG. 4B to calculate a cosine similarity between embedding vectors into which words are converted. According to an embodiment, the processor 1200 may calculate a cosine similarity between embedding vectors before the embedding vectors are input to the deep neural network model 1214 and after the embedding vectors pass through the deep neural network model 1214, and may identify a keyword, based on position proximity between the embedding vectors on a virtual vector space and the calculated cosine similarity. According to an embodiment, when the calculated cosine similarity exceeds a preset threshold, the processor 1200 may identify, as keywords, words for two embedding vectors having the cosine similarity exceeding the preset threshold. According to the embodiment of FIG. 6, 'Good Lock' and 'MultiStar' having positions adjacent to each other on the virtual vector space after passing through the deep neural network model 1214 for intent recognition and having a cosine similarity higher than the preset threshold (for example, 0.9) may be identified as keywords.

Because a cosine similarity between the embedding vectors of 'What' and 'What's' is high but a position relationship between before the embedding vectors of 'What' and 'What's' are input to the deep neural network model 1214 and after the embedding vectors of 'What' and 'What's' pass through the deep neural network model 1214 does not change, 'What' and 'What's' are not identified as keywords.

FIG. 7 is a view for explaining a method, performed by an electronic device, of identifying a keyword, based on a distance change rate for each token of an input inquiry and a representative inquiry between before being input to a deep neural network model for inquiry classification and after passing through the deep neural network model, according to an embodiment of the disclosure.

Referring to FIG. 7, a table 700 illustrates respective distance change rates of tokens including one or more words extracted from the input inquiry 400 of FIGS. 4A and 4B and the representative inquiry 430 of FIGS. 4A and 4B. Herein, a token, which is a unit identified according to a syntax rule in natural language interpretation, is a basic unit having a meaning. The token may be generally defined as a word that has a meaning, although it depends on the context. However, embodiments of the disclosure are not limited thereto, and the token may be defined as a phrase or a character string having a meaning According to the embodiment of FIG. 7, tokens may be 'Good Lock', 'MultiStar', 'What', 'is', and 'What's'.

The processor 1200 of FIGS. 2A and 2B of the electronic device 1000 may execute the instructions or program code associated with the keyword extraction module 1220 of FIG. 4B to calculate a distance change rate of each of a plurality of tokens and identify a keyword, based on the calculated distance change rate. The distance change rate refers to a rate at which, as positions of each of the embedding vectors of the tokens on a virtual vector space change, a distance between the embedding vectors changes. As the distance change rate approaches 1, this means that the embedding vectors change to become closer to each other, and, as the distance change rate approaches 0, this means that the distance between the embedding vectors does not change. As the distance change rate approaches −1, this means that the embedding vectors change to become farther from each other. In other words, the distance change rate may be determined as a value ranging from −1 to 1.

According to an embodiment, positions of each of the embedding vectors of the tokens on the virtual vector space may be changed as a result of intent recognition for inquiry classification using the deep neural network model 1214 of FIGS. 4A and 4B. The processor 1200 may calculate a distance change rate between embedding vectors for each token, based on a position of an embedding vector changed as the embedding vector passes through the deep neural network model 1214. When a distance change rate between embedding vectors exceeds a preset threshold, the processor 1200 may identify tokens corresponding to the embedding vectors as keywords. According to the embodiment of FIG. 7, a distance change rate between respective embedding vectors of 'Good Lock' and 'MultiStar' from among the plurality of tokens is calculated as 0.9, and is higher than a distance change rate between 'Good Lock' and 'is', a distance change rate between 'Good Lock' and 'What'', and a distance change rate between 'Good Lock' and 'What's'. For example, when the preset threshold is 0.9, the processor 1200 may identify 'Good Lock' and 'MultiStar' as keywords.

Figure 8:
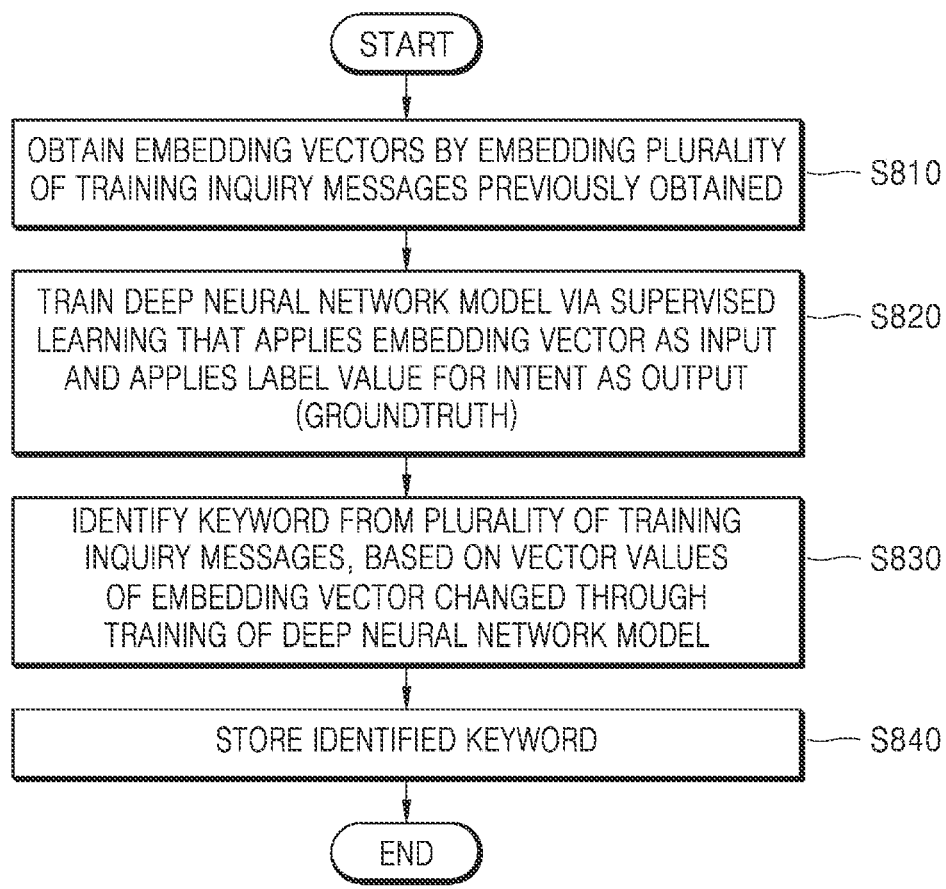
FIG. 8 is a flowchart of a method, performed by an electronic device of extracting a keyword by using a deep neural network model and storing the extracted keyword according to an embodiment of the disclosure.

FIG. 8 is a flowchart of a method, performed by the electronic device 1000, of extracting a keyword by using a deep neural network model and storing the extracted keyword, according to an embodiment of the disclosure.

Referring to FIG. 8, a method, performed by the electronic device 1000, of identifying a keyword via a training process of classifying a plurality of training inquiry messages into a specific intent and storing the identified keyword. Operations S810 through S840 of FIG. 8 are performed before an input inquiry is received from a user, and thus are performed before operation S310 of FIG. 3.

In operation S810, the electronic device 1000 obtains embedding vectors by embedding a plurality of training inquiry messages that are previously obtained. The electronic device 1000 may extract at least one word by parsing each of the plurality of training inquiry messages, and may convert the extracted at least one word into an embedding vector. The electronic device 1000 may convert the at least one word into the embedding vector by using, for example, a well-known word embedding model such as word2vec, GloVe, or onehot coding.

The electronic device 1000 may arrange the embedding vector of the at least one word in a matrix form, and may input the embedding vector arranged in the matrix form to the deep neural network model.

In operation S820, the electronic device 1000 trains the deep neural network model via supervised learning that applies an embedding vector as an input and applies a label value for an intent as output groundtruth. The label value for the intent refers to a preset numerical value for the intent. According to an embodiment, the deep neural network model may be, but is not limited to, a CNN model. The deep neural network model may be implemented as a well-known AI model such as a Recurrent Neural Network (RNN), a Restricted Boltzmann Machine (RBM), a Deep Belief Network (DBN), a Bidirectional Recurrent Deep Neural Network (BRDNN), or Deep Q-Networks.

Through the training in operation S820, vector values of the embedding vector may be changed. Before the embedding vector is input to the deep neural network model, vector values of the embedding vector for extracted words are different from one another due to recognition of the extracted words as unrelated words. However, while the embedding vector is passing through the deep neural network model, extracted words may be classified into the same intent, and thus vectors values of the embedding vector of related words may be changed to similar values.

In operation S830, the electronic device 1000 identifies a keyword from the plurality of training inquiry messages, based on the vector values of the embedding vector changed through the training of the deep neural network model. According to an embodiment, the processor 1200 of FIGS. 2A and 2B of the electronic device 1000 may identify a keyword from the plurality of training inquiry messages, based on a position relationship on a virtual vector space according to the changed vector values of embedding vectors for one or more words included in each of the plurality of training inquiry messages as a result of the training of the deep neural network model. According to an embodiment, the processor 1200 may extract embedding vectors of which position on the virtual vector space according to the vector values of the embedding vectors corresponding to the one or more words are changed to be adjacent to each other, and may identify words corresponding to the extracted embedding vectors as keywords.

According to an embodiment, the processor 1200 may calculate a cosine similarity between embedding vectors adjacent to each other on the virtual vector space, and may identify a keyword, based on the calculated cosine similarity. The processor 1200 may compare the calculated cosine similarity with a preset threshold, and may identify words corresponding to embedding vectors having the cosine similarity exceeding the preset threshold as keywords.

According to an embodiment, the processor 1200 may identify a keyword from the plurality of training inquiry messages, based on a distance change rate between embedding vectors on the virtual vector space via training of the deep neural network model. The processor 1200 may calculate a distance change rate between embedding vectors for each token, based on a position of an embedding vector changed via intent training by using the deep neural network model. When a distance change rate between embedding vectors exceeds a preset threshold, the processor 1200 may identify tokens corresponding to the embedding vectors as keywords.

In operation S840, the electronic device 1000 store the identified keyword. According to an embodiment, the electronic device 1000 may store the keyword identified in operation S830 in the keyword list DB 1320 of FIG. 2B.

Figure 9:
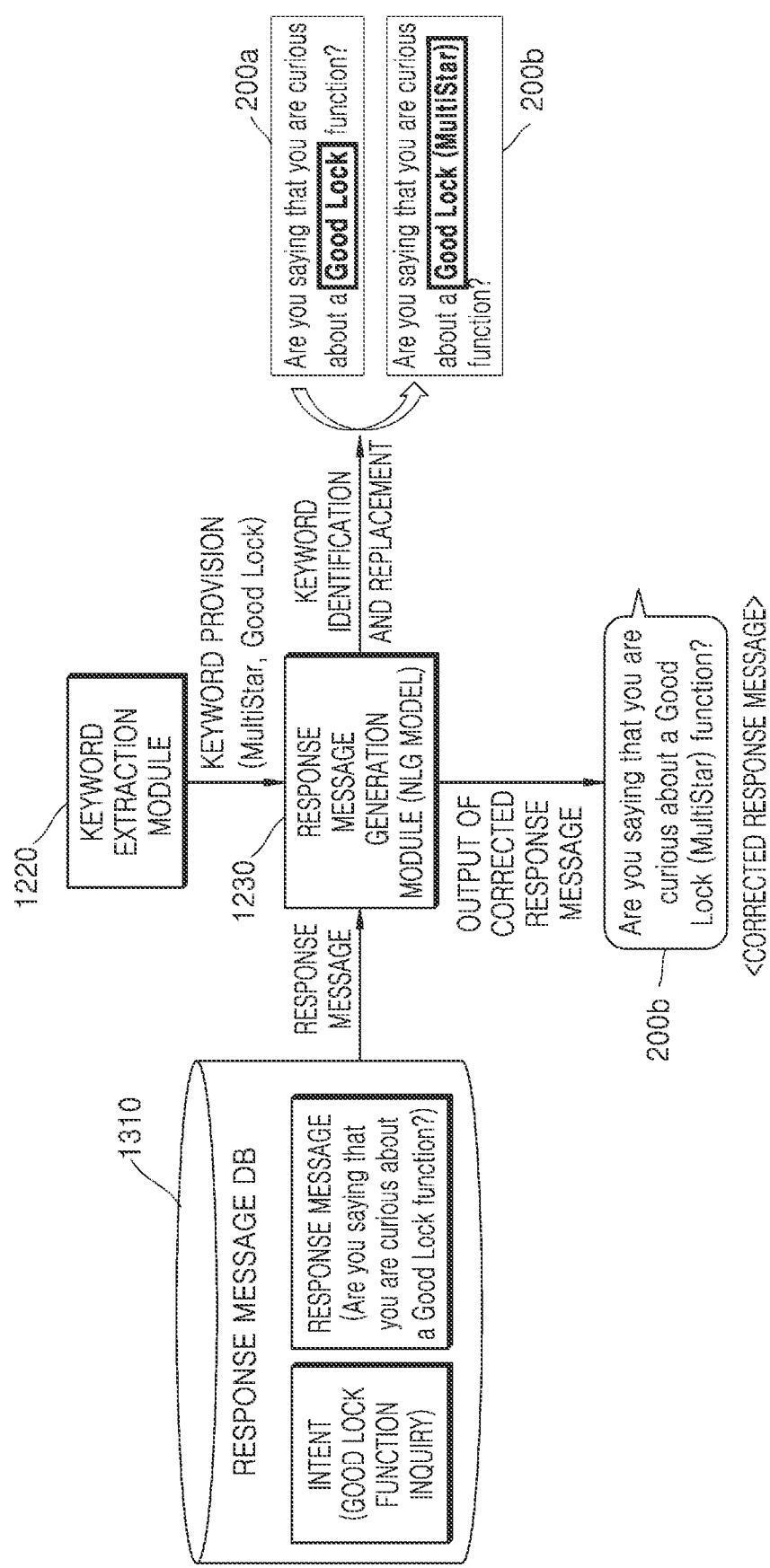
FIG. 9 is a diagram for explaining a method, performed by an electronic device of outputting a corrected response message for an input inquiry of a user according to an embodiment of the disclosure.

FIG. 9 is a diagram for explaining a method, performed by an electronic device, of outputting a corrected response message for an input inquiry of a user, according to an embodiment of the disclosure.

Referring to FIG. 9, the keyword extraction module 1220 extracts 'MultiStar' and 'Good Lock' as keywords, and provides the extracted keywords to the response message generation module 1230. The response message generation module 1230 is configured to correct the response message by using the keyword received from the keyword extraction module 1220. The response message generation module 1230 may include an NLG model.

The response message generation module 1230 may provide a default response message 200a pre-stored in association with the input inquiry, from the response message DB 1310. The default response message 200a stored in the response message DB 1310 is a default message prepared in advance to correspond to an intent analyzed and classified from the input inquiry, and may include at least one of a response message for the input inquiry, a confirmation message, an additional information provision message, or an additional description message.

The processor 1200 of FIGS. 2A and 2B of the electronic device 1000 may execute instructions or program code associated with the response message generation module 1230 to correct the default response message 200a. According to an embodiment, the processor 1200 may correct the default response message 200a by replacing or changing a word included in the default response message 200a received from the response message DB 1310 by using the keyword received from the keyword extraction module 1220 or by adding the keyword to a response message. According to the embodiment of FIG. 9, the processor 1200 may obtain the default response message 200a of "Are you saying that you are curious about the Good Lock function?" from the response message DB 1310, may identify a keyword ('Good Lock') from one or more words included in the default response message 200a by using the keywords 'MultiStar' and 'Good Lock' received from the keyword extraction module 1220, and may generate a corrected response message 200b of "Are you saying that you are curious about the Good Lock (MultiStar) function?" by adding 'MultiStar' to the identified keyword 'Good Lock'.

The electronic device 1000 according to the embodiment of FIG. 9 may not output the default response message 200a pre-stored in the response message DB 1310 without changes, but may correct the default response message 200a to correspond to the input inquiry of the user by using the keywords (for example, 'Good Lock' and 'MultiStar') to output a corrected response message. The electronic device 1000 according to an embodiment of the disclosure may provide accurate information about the input inquiry of the user and improving user satisfaction, by providing the corrected response message 200 adaptively corrected with respect to the input inquiry of the user.

Figure 10:
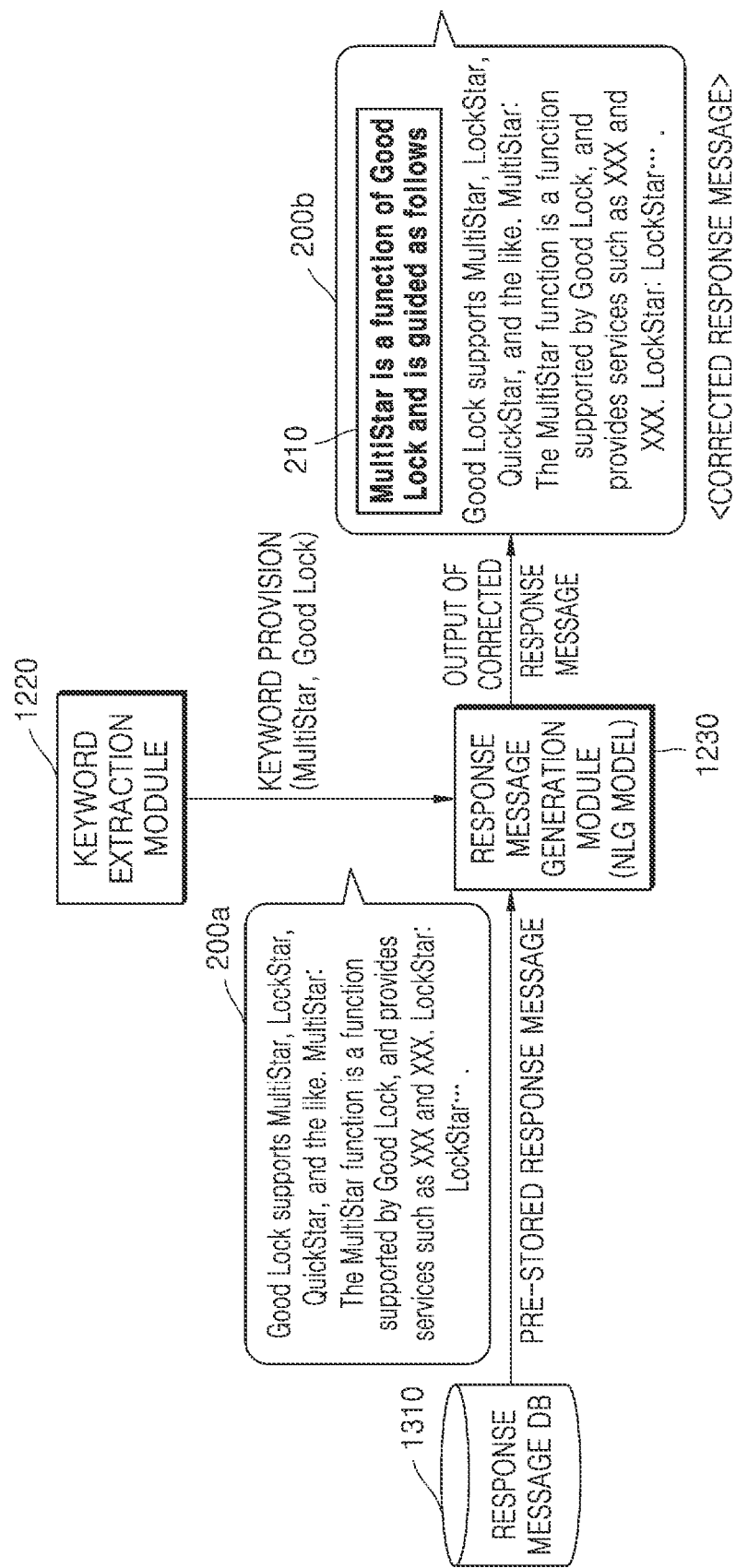
FIG. 10 is a diagram for explaining a method, performed by an electronic device of outputting a corrected response message for an input inquiry of a user according to an embodiment of the disclosure.

FIG. 10 is a diagram for explaining a method, performed by an electronic device, of outputting a corrected response message for an input inquiry of a user, according to an embodiment of the disclosure.

Referring to FIG. 10, the response message generation module 1230 may receive a keyword from the keyword extraction module 1220, and may receive a default response message 200a from the response message DB 1310. The processor 1200 of FIGS. 2A and 2B of the electronic device 1000 may execute the instructions or program code associated with the response message generation module 1230 to generate the corrected response message 200b. According to an embodiment, the processor 1200 may generate a start message 210 including additional information or an additional description associated with the keyword received from the keyword extraction module 1220 and add the start message 210 to the default response message 200a received from the response message DB 1310 to thereby generate the corrected response message 200b. According to the embodiment of FIG. 10, the processor 1200 may generate the start message 210 of "MultiStar is a function of Good Lock and is guided as follows" including additional information associated with 'MultiStar' and 'Good Lock' received from the keyword extraction module 1220, and may add the start message 210 to a front portion of the default response message 200a to thereby generate the corrected response message 200b.

The processor 1200 may output the corrected response message 200b.

The electronic device 1000 according to the embodiment of FIG. 10 may not output the default response message 200a pre-stored in the response message DB 1310 without changes, but may generate the start message 210 including additional information about the keywords (for example, 'Good Lock' and 'MultiStar') and add the start message 210 to the default response message 200a to thereby output the corrected response message 200b providing additional information about the input inquiry of the user. The electronic device 1000 according to an embodiment of the disclosure may improve satisfaction with the input inquiry of the user by providing additional information or an additional description about the input inquiry of the user.

Figure 11:
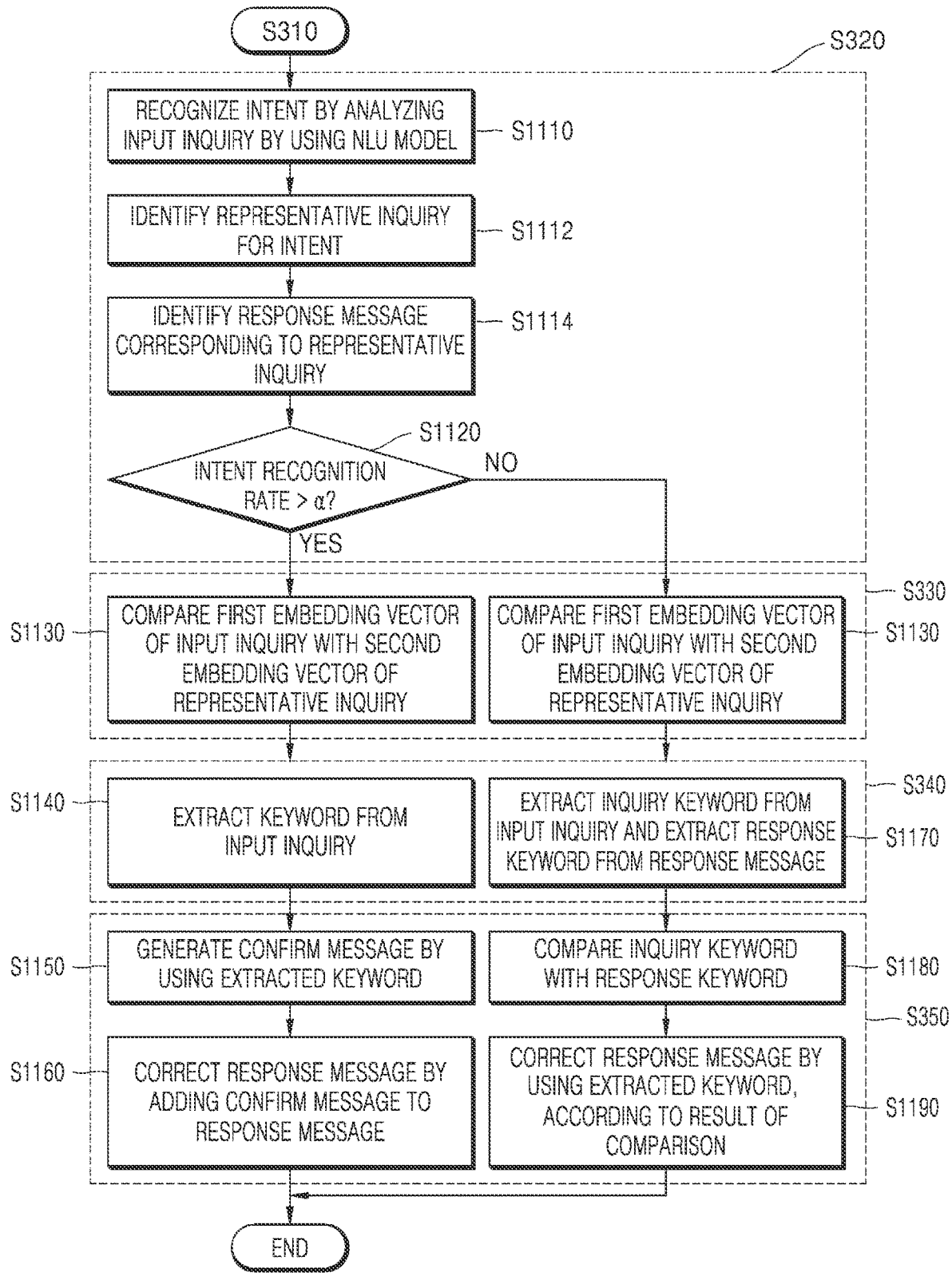
FIG. 11 is a flowchart of a method, performed by an electronic device of correcting a response message, based on a recognition rate of an intent for an input inquiry according to an embodiment of the disclosure.

FIG. 11 is a flowchart of a method, performed by an electronic device, of correcting a response message, based on a recognition rate of an intent for an input inquiry, according to an embodiment of the disclosure.

Referring to FIG. 11, operations S1110 through S1120 of FIG. 11 are operations that embody operation S320 of FIG. 3, and operation S1110 is performed after operation S310 of FIG. 3 is performed. Operations S1140 and S1170 of FIG. 11 are operations that embody operation S340 of FIG. 3, and operations S1150, S1160, S1180, and S1190 are operations that embody operation S350 of FIG. 3.

In operation S1110, the electronic device 1000 recognizes the intent for the input inquiry by analyzing the input inquiry by using the NLU model. According to an embodiment, the electronic device 1000 may parse text included in the input inquiry in units of morphemes, words, or phrases, and may infer the meaning of a word extracted from the parsed text by using linguistic features (e.g., grammatical elements) of morphemes, words, or phrases. The electronic device 1000 may determine an intent corresponding to the meaning of the inferred word by comparing the meaning of the inferred word with predefined intents provided by the NLU model.

According to an embodiment, the electronic device 1000 may obtain at least one intent candidate, based on a probability value that information indicating an utterance intention of the user is predicted as a specific intent, by analyzing the input inquiry by using the NLU model. The probability value may refer to a confidence score. The confidence score may have a value ranging from 0 to 1. The at least one intent candidate may be an N-Best candidate having a confidence score that exceeds a preset threshold. The electronic device 1000 may obtain at least one intent candidate and a confidence value at which each intent candidate may be predicted as an utterance intention for the input query, through the NLU model. The electronic device 1000 may determine, as the intent for the input inquiry, an intent candidate having a highest confidence score from among the at least one intent candidate.

For example, when the input inquiry is "What is the MultiStar function?", the electronic device 1000 may obtain at least one intent candidate such as 'MultiStar function inquiry', 'Good Lock function inquiry', or 'Multimedia function inquiry', by analyzing the input inquiry by using the NLU model. For example, a confidence score for 'MultiStar function inquiry' may be 0.6, a confidence score for 'Good Lock function inquiry' may be 0.3, and a confidence score for 'Multimedia function inquiry' may be 0.1. In this case, the electronic device 1000 may determine, as the intent for the input inquiry, 'MultiStar function inquiry' having a highest confidence score of 0.6 from among the at least one intent candidate.

In operation S1112, the electronic device 1000 identifies a representative inquiry for the intent. According to an embodiment, the electronic device 1000 may search for a representative inquiry mapped to correspond to the intent from the response message DB 1310 of FIGS. 1, 2A, and 2B, and may obtain a found representative inquiry from the response message DB 1310. The representative inquiry refers to an inquiry message having a largest probability (confidence) to be analyzed and classified as a specific intent.

In operation S1114, the electronic device 1000 identifies a response message corresponding to the representative inquiry. According to an embodiment, the electronic device 1000 may obtain a response message mapped to correspond to the representative inquiry from the response message DB 1310.

In operation S1120, the electronic device 1000 may compare an intent recognition rate with a preset threshold (a). The intent recognition rate is a value indicating a degree to which the user's utterance intention for the input inquiry is accurately recognized. According to an embodiment, the intent recognition rate may be a confidence value of each of the at least one intent candidate. For example, when a confidence value of 'MultiStar function inquiry' having a highest confidence score from among the at least one intent candidate for the input inquiry of "What is the MultiStar function?" is 0.6, the intent recognition rate may be 0.6, namely, 60%.

When the intent recognition rate exceeds the preset threshold (a), the electronic device 1000 compares the first embedding vector of the input inquiry with the second embedding vector of the representative inquiry (in operation S1130). Operation S1130 is the same as operation S330 of FIG. 3, and thus a redundant description thereof will be omitted.

In operation S1140, the electronic device 1000 extracts the keyword from the input inquiry. Operation S1140 is the same as operation S340 of FIG. 3, and thus a redundant description thereof will be omitted.

However, embodiments of the disclosure are not limited to the case where operation S1140 is the same as operation S340. According to an embodiment, the electronic device 1000 may extract at least one word by parsing the input inquiry in units of words, compare the extracted at least one word with keywords pre-stored in the keyword list DB 1320 of FIG. 2B, and extract a word, which is the same as a result of the comparison, as a keyword for the input inquiry. For example, when 'MultiStar' is stored in the keyword list DB 1320, the electronic device 1000 may extract 'MultiStar' included in the input inquiry as a keyword within the input inquiry by comparing 'MultiStar' included in the input inquiry with keywords pre-stored in the keyword list DB 1320.

In operation S1150, the electronic device 1000 generates a confirm message by using the extracted keyword. The confirm message is a message asking the user about whether the electronic device 1000 has accurately ascertained the utterance intention, namely, the intent, of the user from the input inquiry. For example, the electronic device 1000 may generate the confirm message of "Are you saying that you are curious about the MultiStar function?" by using the keyword of 'MultiStar' extracted in operation S1140.

In operation S1160, the electronic device 1000 corrects the response message by adding the confirm message to the response message. According to an embodiment, the response message may be mapped with the intent and stored in the response message DB 1310. The electronic device 1000 may correct a pre-stored response message by adding the confirm message generated in operation S1150 to the pre-stored response message.

When the intent recognition rate is less than or equal to the preset threshold (a), the electronic device 1000 extracts an inquiry keyword from the input inquiry and extract a response keyword from the response message (in operation S1170). A method of extracting the inquiry keyword from the input inquiry is the same as operation S1140, and thus a redundant description thereof will be omitted. The electronic device 1000 may extract the response keyword from the response message according to the same method as a method of extracts the inquiry keyword from the input inquiry. For example, when the input inquiry is "What is the MultiStar function?", the electronic device 1000 may extract 'MultiStar' as the inquiry keyword. Similarly, when the response message is "Are you saying that you are curious about the Good Lock function?", the electronic device 1000 may extract 'Good Lock' as the response keyword.

In operation S1180, the electronic device 1000 compares the inquiry keyword with the response keyword. For example, the electronic device 1000 may compare the inquiry keyword of 'MultiStar' with the response keyword of 'Good Lock'.

In operation S1190, the electronic device 1000 corrects the response message by using the extracted keyword, according to a result of the comparison. When the inquiry keyword and the response keyword are not the same as each other as a result of the comparison, the electronic device 1000 may correct the response message by using the extracted keyword. For example, because the inquiry keyword of 'MultiStar' and the response keyword of 'Good Lock' are not the same as each other as a result of comparison, the electronic device 1000 may correct a default response message of "Are you saying that you are curious about the Good Lock function?" to "Are you curious about the Good Lock (MultiStar) function?" by using the inquiry keyword of 'MultiStar'.

The electronic device 1000 may output the corrected response message.

Figure 12:
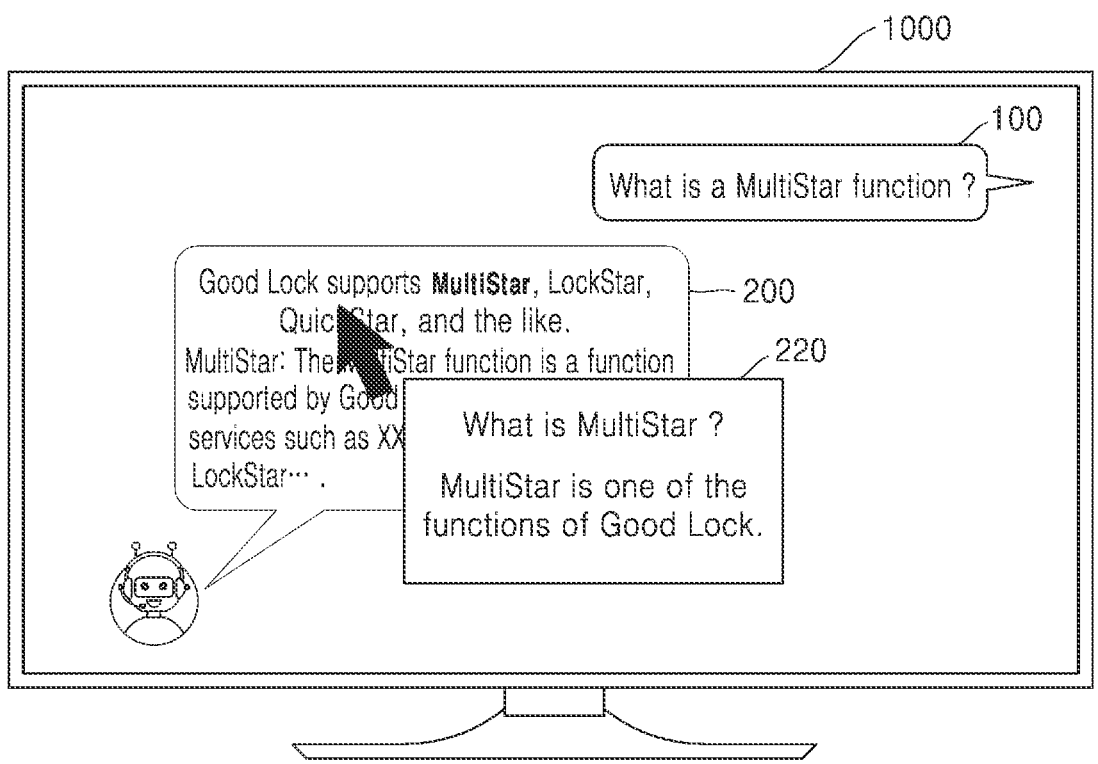
FIG. 12 is a view illustrating a method, performed by an electronic device of outputting a response message according to an embodiment of the disclosure.

FIG. 12 is a view illustrating a method, performed by an electronic device, of outputting a response message, according to an embodiment of the disclosure.

Referring to FIG. 12, the electronic device 1000 may output an input inquiry 100 and the response message 200. The electronic device 1000 may display a keyword included in the response message 200 to be distinguished from another word or other characters. For example, the electronic device 1000 may display the keyword in a color distinguished from that for displaying the other word or characters, or displaying the keyword in bold.

According to an embodiment, when the electronic device 1000 receives, through an input device such as a mouse, a user input of locating a cursor on the keyword included in the response message 200, the electronic device 1000 may display a pop-up message 220 including a message about additional information or an additional description regarding the keyword. According to an embodiment, when the electronic device 1000 includes a touch screen for receiving a touch input and receives a user input of touching the keyword through the touch screen, the electronic device 1000 may display the pop-up message 220 related to additional information or an additional description regarding the keyword.

According to the embodiment of FIG. 12, the electronic device 1000 may improve visibility of the user by highlighting and displaying the keyword within the response message 200 such that the keyword is distinguished from other words. Moreover, the electronic device 1000 may improve user convenience by providing the pop-up message 220 including additional information or an additional description about a word selected through a user input.

The program executed by the electronic device 1000 described above herein may be implemented as a hardware component, a software component, and/or a combination of hardware components and software components. The program may be executed by any system capable of executing computer readable instructions.

The software may include a computer program, a code, instructions, or a combination of one or more of the foregoing, and may constitute a processing device so that the processing device can operate as desired, or may independently or collectively instruction the processing device.

The software may be implemented as a computer program including instructions stored in computer-readable storage media. Examples of the computer-readable recording media include magnetic storage media (e.g., ROM, floppy disks, hard disks, etc.), and optical recording media (e.g., CD-ROMs, or digital versatile discs (DVDs)). The computer-readable recording media can be distributed over network coupled computer systems so that the computer-readable code is stored and executed in a distributive manner. These media can be read by the computer, stored in a memory, and executed by a processor.

Computer-readable storage media may be provided in the form of non-transitory storage media. Here, 'non-transitory' means that the storage medium does not include a signal and is tangible, but does not include distinguish whether data is stored semi-permanently or temporarily in the storage medium.

Programs according to various embodiments disclosed herein may be provided by being included in computer program products. Computer program products are commodities and thus may be traded between sellers and buyers.

Computer program products may include a software program and a computer-readable storage medium having the software program stored thereon. For example, computer program products may include a product in the form of a software program (e.g., a downloadable application) that is electronically distributed through device manufacturers or electronic markets (e.g., Google Play Store and AppStore). For electronic distribution, at least a portion of the software program may be stored on a storage medium or may be created temporarily. In this case, the storage medium may be a server of a manufacturer, a server of an electronic market, or a storage medium of a relay server for temporarily storing a software program.

The computer program products may include, in a system including a server and a device, a storage medium of the server or a storage medium of the device. Alternatively, if there is a third device (e.g., a smartphone) in communication with the server or device, the computer program products may include a storage medium of the third device. Alternatively, the computer program products may include the software program itself transmitted from the server to the device or the third device, or transmitted from the third device to the device.

In this case, one of the server, the device, and the third device may execute the computer program products to perform the methods according to the disclosed embodiments. Alternatively, at least two of the server, the device, and the third device may execute the computer program products to distribute and perform the methods according to the disclosed embodiments.

For example, a server may execute a computer program product to control a device in communication with the server to perform the methods according to the disclosed embodiments.

As another example, a third device may execute a computer program product to control a terminal in communication with the third device to perform the methods according to the disclosed embodiments.

When the third device executes the computer program product, the third device may download the computer program product from the server and execute the downloaded computer program product. Alternatively, the third device may execute a computer program product provided in a preloaded state to perform methods according to the disclosed embodiments.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method, performed by an electronic device, of processing an inquiry of a user, the method comprising:
   receiving an input inquiry input by the user;
   obtaining a label value representing an intent of the input inquiry by analyzing the input inquiry by using a natural language understanding (NLU) model;
   identifying a representative inquiry mapped to correspond to the label value from among a plurality of representative inquiries that are stored in a response message database;
   comparing a vector value of a first embedding vector of the input inquiry changed during the identifying of the representative inquiry with a vector value of a second embedding vector of the representative inquiry;
   identifying a keyword from the input inquiry, based on a result of the comparing; and
   correcting a response message mapped to correspond to the representative inquiry, by using the identified keyword,
   wherein the response message database stores the plurality of representative inquiries for a plurality of intents previously obtained before the input inquiry is received from the user, and
   wherein each of the plurality of representative inquiries is mapped to correspond to respective label values for each of the plurality of intents.

2. The method of claim 1, wherein the identifying of the keyword from the input inquiry comprises identifying the keyword from the input inquiry, based on a position relationship in a virtual vector space according to the vector value of the first embedding vector for one or more words included in the input inquiry changed by the NLU model and the vector value of the second embedding vector.

3. The method of claim 2, wherein the identifying of the keyword from the input inquiry comprises:
   calculating a cosine similarity between the first embedding vector and the second embedding vector; and
   identifying the keyword, based on a position proximity of an embedding vector in the virtual vector space and the calculated cosine similarity.

4. The method of claim 2, wherein the identifying of the keyword from the input inquiry comprises identifying the keyword from the input inquiry, based on a distance change rate in the virtual vector space between the first embedding vector changed by the NLU model and the second embedding vector.

5. The method of claim 1, wherein the correcting of the response message comprises correcting the response message by replacing or changing a word included in the response message by using the identified keyword or adding the identified keyword to the response message.

6. The method of claim 1, wherein the correcting of the response message comprises:
   generating an answer start message comprising at least one of additional information and an additional description related to the identified keyword; and
   adding the answer start message to the response message.

7. The method of claim 1, further comprising:
   identifying the response message mapped to correspond to the label value representing the intent of the input inquiry.

8. An electronic device for processing an inquiry of a user, the electronic device comprising:
   a communication interface configured to perform data transmission/reception with another device;
   a memory storing a program comprising one or more instructions; and
   a processor configured to execute the one or more instructions of the program stored in the memory,
   wherein the processor is further configured to:
      receive an input inquiry input by the user through the communication interface,
      obtain a label value representing an intent of the input inquiry by analyzing the input inquiry by using a natural language understanding (NLU) model,
      identify a representative inquiry mapped to correspond to the label value from among a plurality of representative inquiries that are stored in a response message database, compare a vector value of a first embedding vector of the input inquiry changed during the identifying of the representative inquiry with a vector value of a second embedding vector of the representative inquiry, identify a keyword from the input inquiry, based on a result of the comparing, and correct a response message mapped to correspond to the representative inquiry, by using the identified keyword, wherein the response message database stores the plurality of representative inquiries for a plurality of intents previously obtained before the input inquiry is received from the user, and wherein each of the plurality of representative inquiries is mapped to correspond to respective label values for each of the plurality of intents.

9. The electronic device of claim 8, wherein the processor is further configured to identify the keyword from the input inquiry, based on a position relationship in a virtual vector space according to the vector value of a first embedding vector for one or more words included in the input inquiry changed by the NLU model and a vector value of the second embedding vector.

10. The electronic device of claim 9, wherein the processor is further configured to:

calculate a cosine similarity between the first and second embedding vectors, and identify the keyword, based on a position proximity of the embedding vectors in the virtual vector space and the calculated cosine similarity.

11. The electronic device of claim 9, wherein the processor is further configured to identify the keyword from the input inquiry, based on a distance change rate in the virtual vector space between the first embedding vector changed by the NLU model and the second embedding vector.

12. The electronic device of claim 8, wherein the processor is further configured to correct the response message by replacing or changing a word included in the response message by using the identified keyword or adding the identified keyword to the response message.

13. The electronic device of claim 8, wherein the processor is further configured to generate an answer start message comprising at least one of additional information and an additional description related to the identified keyword and add the answer start message to the response message.

14. The electronic device of claim 8, wherein the processor is further configured to:

identify the response message mapped to correspond to the label value representing the intent of the input inquiry.

15. A non-transitory computer program product comprising a computer-readable storage medium, the computer-readable storage medium comprising instructions executed by a device to perform:

receiving an input inquiry input by a user;

obtaining a label value representing an intent of the input inquiry by analyzing the input inquiry by using a natural language understanding (NLU) model;

identifying a representative inquiry mapped to correspond to the label value from among a plurality of representative inquiries that are stored in a response message database;

comparing a vector value of a first embedding vector of the input inquiry changed during the identifying of the representative inquiry with a vector value of a second embedding vector of the representative inquiry;

identifying a keyword from the input inquiry, based on a result of the comparing; and correcting a response message mapped to correspond to the representative inquiry, by using the identified keyword, wherein the response message database stores the plurality of representative inquiries for a plurality of intents previously obtained before the input inquiry is received from the user, and wherein each of the plurality of representative inquiries is mapped to correspond to respective label values for each of the plurality of intents.

* * * * *